United States Patent
Taneja

(10) Patent No.: US 9,332,487 B2
(45) Date of Patent: May 3, 2016

(54) NETWORK ASSISTED ACCESS NETWORK SELECTION ENHANCEMENTS FOR A MACHINE-TO-MACHINE WIRELESS NETWORK ENVIRONMENT

(71) Applicant: CISCO TECHNOLOGY, INC., San Jose, CA (US)

(72) Inventor: Mukesh Taneja, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/327,334

(22) Filed: Jul. 9, 2014

(65) Prior Publication Data

US 2016/0014676 A1   Jan. 14, 2016

(51) Int. Cl.
| | | |
|---|---|---|
| H04W 72/00 | (2009.01) | |
| H04W 48/16 | (2009.01) | |
| H04W 48/20 | (2009.01) | |
| H04W 4/00 | (2009.01) | |
| H04W 76/02 | (2009.01) | |

(52) U.S. Cl.
CPC ............. *H04W 48/16* (2013.01); *H04W 4/005* (2013.01); *H04W 48/20* (2013.01); *H04W 76/021* (2013.01)

(58) Field of Classification Search
CPC ....... H04W 4/005; H04W 4/006; H04W 4/02; H04W 4/08; H04W 28/00; H04W 28/02; H04W 28/0247; H04W 28/028; H04W 28/0273; H04W 28/0289; H04W 28/06; H04W 28/0284; H04W 28/08
USPC ........ 455/403, 414.1, 415, 432.3, 434, 435.1, 455/435.2, 436, 437, 443, 444, 550.1, 455/552.1, 552.2, 553
See application file for complete search history.

(56) References Cited

U.S. PATENT DOCUMENTS

| | | | |
|---|---|---|---|
| 8,687,543 | B2 | 4/2014 | McRae et al. |
| 8,711,968 | B2 | 4/2014 | Seok |
| 8,737,229 | B2 | 5/2014 | Khandekar et al. |
| 8,743,772 | B2 | 6/2014 | Garavaglia et al. |

(Continued)

OTHER PUBLICATIONS

3GPP TS 24.312 V10.5.0 (Mar. 2012) Technical Specification, "3rd Generation Partnership Project; Technical Specification Group Core Network and Terminals; Access Network Discovery and Selection Function (ANDSF) Management Object (MO) (Release 10)," 3GPP, A Global Initiative, Valbonne-France; Mar. 2012; 155 pages.

(Continued)

*Primary Examiner* — Jean Gelin
(74) *Attorney, Agent, or Firm* — Patent Capital Group

(57) ABSTRACT

A method provided in one embodiment includes determining a first resource indicator indicative of a first resource capability of a first network element, determining a second resource indicator indicative of a second resource capability of the first network element, determining a third resource indicator indicative of a third resource capability of the first network element, and sending the first resource indicator, the second resource indicator, and the third resource indicator to a second network element. The second network element is configured to determine a first metric value for the first network element based upon the first resource indicator, the second resource indicator, and the third resource indicator. The second network element is further configured to utilize the first metric value to determine a list of one or more acceptable network elements for a wireless device to establish a connection therewith.

19 Claims, 22 Drawing Sheets

(56) References Cited

U.S. PATENT DOCUMENTS

| | | | |
|---|---|---|---|
| 8,966,584 B2 * | 2/2015 | Hughes et al. | 726/3 |
| 2003/0054829 A1 * | 3/2003 | Moisio | 455/452 |
| 2005/0114520 A1 * | 5/2005 | White et al. | 709/228 |
| 2008/0214200 A1 * | 9/2008 | Grandblaise et al. | 455/452.2 |
| 2010/0041412 A1 * | 2/2010 | Yu | 455/450 |
| 2010/0061334 A1 | 3/2010 | Gault | |
| 2010/0214943 A1 * | 8/2010 | Immendorf et al. | 370/252 |
| 2011/0282989 A1 | 11/2011 | Geirhofer | |
| 2011/0310787 A1 * | 12/2011 | Sheriff et al. | 370/315 |
| 2013/0039340 A1 * | 2/2013 | Lappetelainen et al. | 370/331 |
| 2013/0328996 A1 * | 12/2013 | Rawat et al. | 348/14.02 |
| 2014/0133365 A1 * | 5/2014 | Peng et al. | 370/278 |
| 2014/0179238 A1 * | 6/2014 | Wynn et al. | 455/67.11 |
| 2014/0328329 A1 | 11/2014 | Novlan | |
| 2014/0355430 A1 * | 12/2014 | Smith et al. | 370/230 |
| 2015/0172905 A1 | 6/2015 | Qi et al. | |
| 2015/0215903 A1 | 7/2015 | Zhao et al. | |

OTHER PUBLICATIONS

U.S. Appl. No. 14/535,013, filed Nov. 6, 2014, entitled "Network Assisted Access Network Selection Enhancements for a Machine-to-Machine Wireless Network Environment" Inventor: Mukesh Taneja.

USPTO Oct. 22, 2015 Non-Final Office Action from U.S. Appl. No. 14/535,103.

* cited by examiner

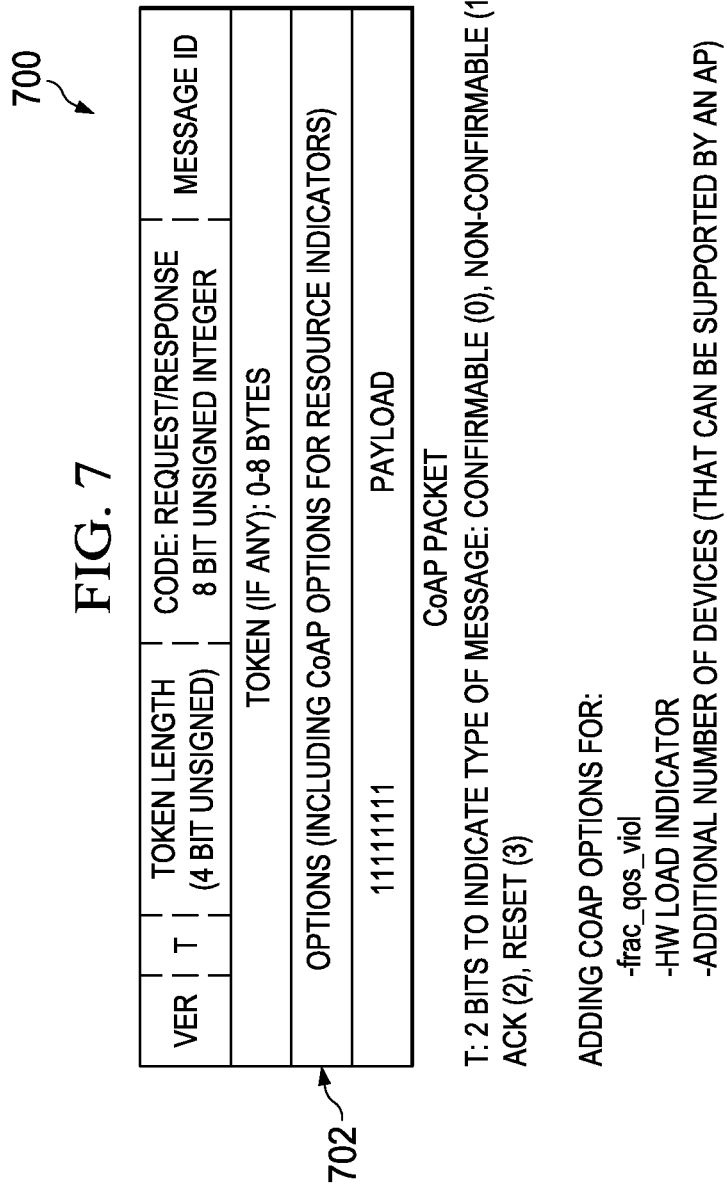

| OPTION NUMBER | C | U | N | R | NAME | FORMAT | LENGTH | DEFAULT |
|---|---|---|---|---|---|---|---|---|
| OPTION NUMBER FOR "ADDITIONAL NUMBER OF DEVICES THAT CAN BE SUPPORTED" | | | x | | Additional_ Number_ Devices OPTION | INTEGER | 2 BYTES | NONE |

804

| OPTION NUMBER | C | U | N | R | NAME | FORMAT | LENGTH | DEFAULT |
|---|---|---|---|---|---|---|---|---|
| OPTION NUMBER FOR "HW LOAD INDICATOR" | | | x | | HW_load _indicator OPTION | INTEGER | 1 BYTE | NONE |

806

| OPTION NUMBER | C | U | N | R | NAME | FORMAT | LENGTH | DEFAULT |
|---|---|---|---|---|---|---|---|---|
| OPTION NUMBER FOR "frac_qos_viol_ indicator" | | | x | | "frac_qos _viol _Indicator" OPTION (LOW, MEDIUM, HIGH,....) | INTEGER | 1 BYTE | NONE |

NETWORK ASSISTED ACCESS NETWORK SELECTION ENHANCEMENTS FOR A MACHINE-TO-MACHINE WIRELESS NETWORK ENVIRONMENT

TECHNICAL FIELD

This disclosure relates in general to the field of communications and, more particularly, to network assisted access network selection for a machine-to-machine wireless network environment.

BACKGROUND

Machine-to-Machine (M2M) refers generally to technologies that allow wireless and/or wired devices to communicate with other devices and may have a wide range of applications in areas such as industrial automation, smart city, healthcare, transportation, logistics, monitoring and control applications. In a case of industrial instrumentation M2M may include a context in which a device having a sensor captures an event (such as a temperature, pressure, inventory level, etc.) at a particular location, and the device relays the captured event information through an access network (wireless, wired or hybrid) to an M2M server (or an M2M gateway or an M2M service platform) having an application in an application program that translates the captured event information into meaningful information to be presented to a user or system such as to monitor or control a particular device or system. M2M devices use multiple types of access technologies to communicate with M2M server(s). Some M2M devices may use only a single type of radio access technology (RAT), while other M2M devices may support multiple RATs. Wireless APs and some other network nodes typically have constraints on the number of devices and/or active sessions they can support. These limitations may exist not only for scenarios where video surveillance cameras are used as M2M devices but even for scenarios in which M2M devices carry a very low amount of data traffic. Efficient procedures are needed in these networks to help M2M devices select a suitable AP dynamically as part of access selection mechanisms.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIG. 7 is a diagram of a packet for communicating resource indicators from the wireless APs to the traffic management/analytics module in accordance with one embodiment of the present disclosure;

FIG. 8 illustrates an example embodiment of option formats for conveying the resource indicators in an option field of the packet of FIG. 7;

DETAILED DESCRIPTION OF EXAMPLE EMBODIMENTS

Overview

Figure 1:
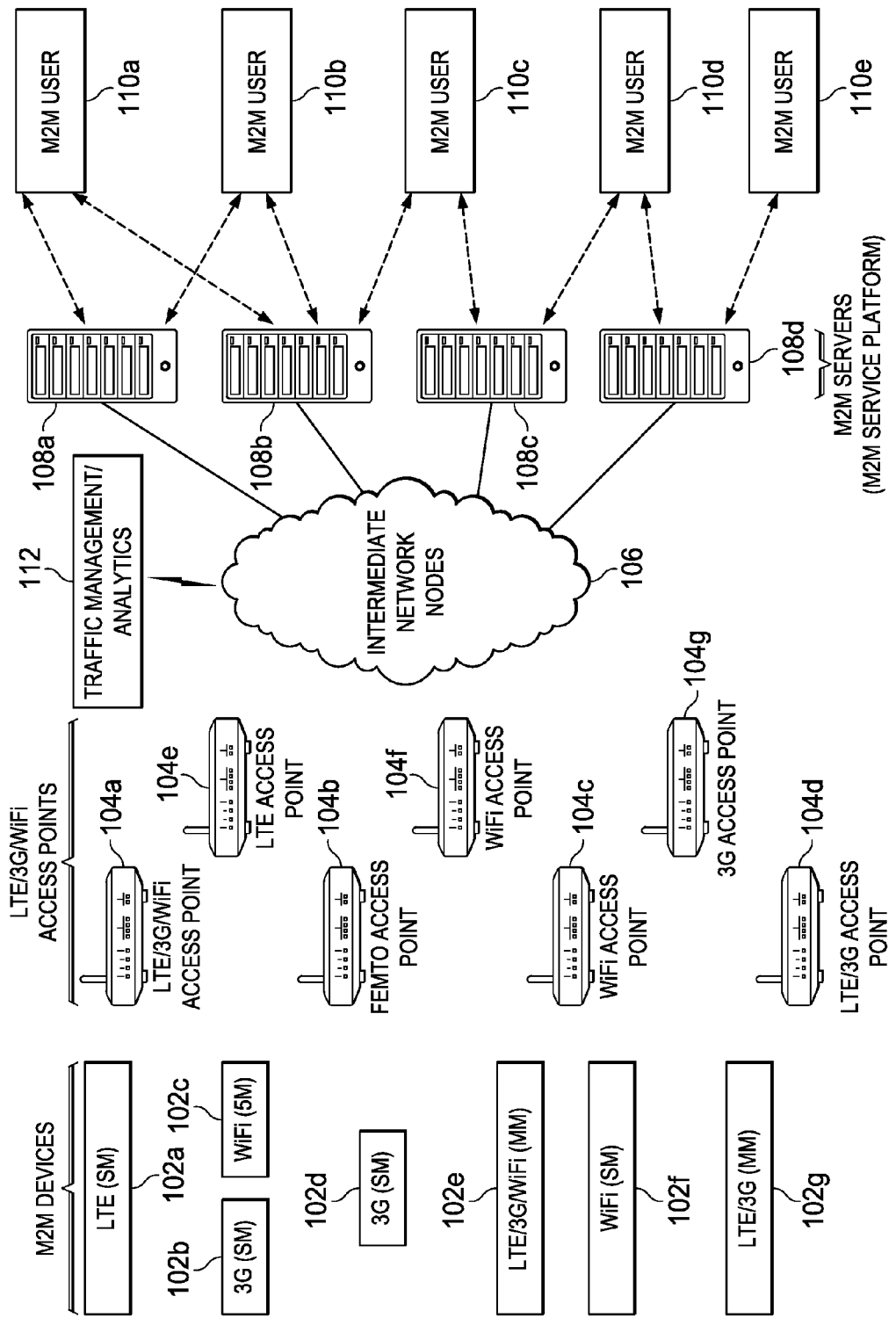
FIG. 1 is a simplified block diagram of a communication system for network assisted access network selection for a machine-to-machine wireless network environment in accordance with one embodiment of the present disclosure.

A method is provided in one example embodiment and includes determining a first resource indicator indicative of a first resource capability of a first network element, determining a second resource indicator indicative of a second resource capability of the first network element, determining a third resource indicator indicative of a third resource capability of the first network element, and sending the first resource indicator, the second resource indicator, and the third resource indicator to a second network element. The second network element is configured to determine a first metric value for the first network element based upon the first resource indicator, the second resource indicator, and the third resource indicator. The second network element is further configured to utilize the first metric value to determine a list of one or more acceptable network elements for a wireless device to establish a connection therewith.

In more specific embodiments, the first resource indicator is indicative of an additional number of wireless devices that the first network element can support in a predetermined time interval. In other specific embodiments, the second resource indicator is indicative of a hardware load of the first network element at a predetermined time. In still other specific embodiments, the second resource indicator includes a value indicative of either a low hardware load, a medium hardware load, or a high hardware load upon the first network element. In still other specific embodiments, the third resource indicator is indicative of a fraction of flows traversing the first network element for which a quality of service (QoS) requirement was violated.

In other specific embodiments, sending one or more of the first resource indicator, the second resource indicator, and the third resource indicator to the second network element includes including one or more of the first resource indicator, the second resource indicator, and the third resource indicator within a Constrained Application Protocol (CoAP) protocol message. In other specific embodiments, the CoAP protocol message is a CoAP Observe message. In still other specific embodiments, at least one of the first resource indicator, the second resource indicator, and the third resource indicator are included in an option field of the CoAP protocol message.

In other specific embodiments, the method further includes receiving the list of one or more network elements, and sending the list of one or more acceptable network elements to the wireless device. In still other specific embodiments, sending the list of one or more acceptable network elements includes sending the list of one or more acceptable network elements within at least one of a WiFi beacon message, a WiFi probe response message, or a cellular random access procedure message.

In other specific embodiments, the first network element includes a wireless access point. In still other specific embodiments, the second network element includes a server.

An example of logic encoded in one or more non-transitory media according to one embodiment includes code for execution and when executed by a processor operable to perform operations including determining a first resource indicator indicative of a first resource capability of a first network element, determining a second resource indicator indicative of a second resource capability of the first network element, determining a third resource indicator indicative of a third resource capability of the first network element, and sending the first resource indicator, the second resource indicator, and the third resource indicator to a second network element. The second network element is configured to determine a first metric value for the first network element based upon the first resource indicator, the second resource indicator, and the third resource indicator. The second network element is further configured to utilize the first metric value to determine a list of one or more acceptable network elements for a wireless device to establish a connection therewith.

An example first network element according to one embodiment includes a memory element configured to store electronic code, a processor operable to execute instructions associated with the electronic code, and a module coupled to the memory element and the processor. The first network element is configured for determining a first resource indicator indicative of a first resource capability of the first network element, determining a second resource indicator indicative of a second resource capability of the first network element, determining a third resource indicator indicative of a third resource capability of the first network element, and sending the first resource indicator, the second resource indicator, and the third resource indicator to a second network element. The second network element is configured to determine a first metric value for the first network element based upon the first resource indicator, the second resource indicator, and the third resource indicator. The second network element is further configured to utilize the first metric value to determine a list of one or more acceptable network elements for a wireless device to establish a connection therewith.

A method is provided in another example embodiment and includes receiving, at a first network element, a first resource indicator indicative of a first resource capability of each of a plurality of second network elements, receiving, at the first network element, a second resource indicator indicative of a second resource capability of each of the plurality of second network elements, and receiving, at the first network element, a third resource indicator indicative of a third resource capability of each of the plurality of second network elements. The method further includes determining a metric value for each of the plurality of second network elements based upon the first resource indicator, the second resource indicator, and the third resource indicator of each of the second network elements, and determining a list of one or more acceptable network elements from the plurality of second network elements for a wireless device to establish a connection therewith based upon the metric value of each of the plurality of second network elements.

In more specific embodiments, the first resource indicator is indicative of an additional number of wireless devices that the second network element can support in a predetermined time interval. In still other specific embodiments, the second resource indicator is indicative of a hardware load of the second network element at a predetermined time. In still other specific embodiments, the second resource indicator includes a value indicative of either a low hardware load, a medium hardware load, or a high hardware load upon the second network element.

In still other specific embodiments, the third resource indicator is indicative of a fraction of flows traversing the second network element for which a quality of service (QoS) requirement was violated. In other specific embodiments, receiving one or more of the first resource indicator, the second resource indicator, and the third resource indicator by the first network element includes receiving one or more of the first resource indicator, the second resource indicator, and the third resource within a Constrained Application Protocol (CoAP) protocol message. In still other embodiments, the CoAP protocol message is a CoAP Observe message. In still other specific embodiments, at least one of the first resource indicator, the second resource indicator, and the third resource indicator are included in an option field of the CoAP protocol message.

In still other specific embodiments, the method further includes sending the list of one or more acceptable network elements to a particular one of the plurality of second network elements, wherein the particular one of the plurality of second network elements is configured to send the list of one or more acceptable network elements to the wireless device.

In other specific embodiments, the list of one or more acceptable network elements is arranged in ascending order of the metric value of each of the acceptable network elements. In still other specific embodiments, the wireless device is configured to establish a connection with a particular one of the acceptable network elements having the lowest metric value among the acceptable network elements having an acceptable received signal strength with the wireless device.

In other specific embodiments, the first network element includes a server. In still other specific embodiments, one or more of the plurality of second network elements includes a wireless access point.

An example of logic encoded in one or more non-transitory media according to another embodiment includes code for execution and when executed by a processor operable to perform operations including receiving, at a first network element, a first resource indicator indicative of a first resource capability of each of a plurality of second network elements, receiving, at the first network element, a second resource indicator indicative of a second resource capability of each of the plurality of second network elements, and receiving, at the first network element, a third resource indicator indicative of a third resource capability of each of the plurality of second network elements. The operations further include determining a metric value for each of the plurality of second network elements based upon the first resource indicator, the second resource indicator, and the third resource indicator of each of the second network elements, and determining a list of one or more acceptable network elements from the plurality of second network elements for a wireless device to establish a connection therewith based upon the metric value of each of the plurality of second network elements.

An example first network element according to one embodiment includes a memory element configured to store electronic code, a processor operable to execute instructions associated with the electronic code, and a module coupled to the memory element and the processor. The first network element is configured for receiving a first resource indicator indicative of a first resource capability of each of a plurality of second network elements, receiving a second resource indicator indicative of a second resource capability of each of the plurality of second network elements, and receiving a third resource indicator indicative of a third resource capability of each of the plurality of second network elements. The first network element is further configured for determining a metric value for each of the plurality of second network elements based upon the first resource indicator, the second resource indicator, and the third resource indicator of each of the second network elements, and determining a list of one or more acceptable network elements from the plurality of second network elements for a wireless device to establish a connection therewith based upon the metric value of each of the plurality of second network elements.

Example Embodiments

Referring to FIG. 1, FIG. 1 is a simplified block diagram of a communication system 100 for network assisted access network selection for a machine-to-machine wireless network environment in accordance with one embodiment of the present disclosure. Communication system 100 includes a plurality of machine-to-machine (M2M) devices 102a-102g, a plurality of wireless access points (APs) 104a-104h, intermediate network nodes 106, a plurality of M2M servers 108a-108d, a plurality of M2M user 110a and a traffic management analytics module 112. All the M2M servers shown in 108a-108d could be part of an M2M service platform. Each of M2M devices 102a-102g are configured to be in wireless communication with one or more of wireless APs 104a-104g dependent upon the particular access technologies supported by each of M2M devices 102a-102g and wireless APs 104a-104g. Each of wireless APs 104a-104h are in communication with intermediate network nodes 106. Intermediate network nodes 106 are in further communication with M2M servers 108a-108d (and these M2M servers could be part of an M2M service platform). In the particular embodiment illustrated in FIG. 1, traffic management/analytics module 112 is in communication with intermediate network nodes 106. In a particular embodiment, traffic management/analytics module 112 may be part of the M2M service platform. In still other embodiments, traffic management/analytics module 112 may be a standalone component such as shown in FIG. 1.

Machine-to-Machine (M2M) refers generally to technologies that allow wireless and/or wired systems to communicate with other devices and may have a wide range of applications in areas such as industrial automation, smart cities, healthcare, transportation, logistics, monitoring and control applications. In a case of industrial instrumentation M2M may include a context in which a device having a sensor captures an event (such as a temperature, pressure, inventory level, etc.) at a particular location, and the device relays the captured event information through an access network (wireless, wired or hybrid) to an M2M server (or an M2M service platform) having an application in an application program that translates the captured event information into meaningful information to be presented to a user or system such as to monitor or control a particular device or system.

In particular embodiments, M2M devices 102a-102g may use multiple types of access technologies to communicate with M2M server 108a. Some M2M devices may use only a single type of radio access technology (RAT) designated as single mode (SM) M2M devices. For example, M2M devices used for energy metering purpose may use 2G or 3G RAT in some examples. Some M2M devices may support multiple RATs such as video surveillance cameras supporting LTE and WiFi RATs or M2M devices that are configured to support multiple RATs because they convey safety critical information (such as a gas leak detector or a fire alarm). Those M2M devices supporting multiple RATs may be referred to as multimode (MM) M2M devices. In the particular embodiment illustrated in FIG. 1, M2M device 102a is a single mode LTE device, M2M device 102b is a single mode 3G device, M2M device 102c is a single mode WiFi device, M2M device 102d is a 3G single mode device, M2M device 102e is a multimode LTE/3G/WiFi device, M2M device 102f is a single mode WiFi device, and M2M device 102g is a multimode LTE/3G device.

Similarly, wireless APs 104a-104g may each be configured to communicate using one or more RATs. In the particular embodiment illustrated in FIG. 1, wireless AP 104a is a LTE/3G/WiFi AP, wireless AP 104b is a femtocell AP, wireless AP 104c is a WiFi AP, wireless AP 104d is an LTE/3G AP, wireless AP 104e is an LTE AP, wireless AP 104f is a WiFi AP, and wireless AP 104g is a 3G AP. In still other embodiments, one or more of M2M devices 102a-102g may support other access technologies such as IEEE802.15.4 or wireline access. Each of M2M servers 108a-108d may be part of an M2M service platform and be configured to receive communications from one or more of M2M devices 102a-102g and provide an M2M service via one or more M2M services or M2M applications to one or more of M2M users 110a.

Wireless APs and some other network nodes typically have constraints on the number of (user) devices and/or active sessions they can support. For example, LTE/3G small cell APs and even Macro (e) NodeB can support a limited number of sessions/devices. Very high control plane load may result in the network at certain instants if all M2M requests are sent simultaneously. Control plane mechanisms that create this may limitation include one or more of the following: security procedures such as (re)authentication—e.g. signaling for security purposes (such as AKA including AS-SMC and NAS-SMC for LTE/3G, 802.1X/.11i for WiFi); lower layer synchronization procedures between M2M devices and the wireless AP; session establishment/management for large number of M2M devices; and an M2M device moving from sleep/idle to active state and associated procedures after the movement to active state. It should be noted that these limitations may exist even for the scenarios in which M2M devices carry very low amounts of data traffic.

Very high data plane load may result in the network at certain time instants if data corresponding to a large number of M2M requests (or responses) is sent simultaneously. Data plane related limitations may exist for the cases where M2M devices produce a large amount of data (such as video cameras used in surveillance applications).

Wireless APs typically also have memory limitations. If large number of M2M requests reach wireless APs and corresponding M2M devices are in sleep mode, the wireless AP may not even be able to buffer those. It should be noted that an M2M request could be a simple request or it could be carrying certain commands for actuators. It could even be carrying firmware to download in M2M devices.

Additional constraints for cellular M2M networks that impact network-wide performance decisions may also exist. Wireless APs can support a limited number of devices or active sessions. Some M2M devices may send a low amount of infrequent data while some M2M devices may send a large amount of data (such as video surveillance cameras). Wireless APs may also have high overhead due to control plane signaling (including security mechanisms). In addition, cellular APs may not hold the context of sessions when those sessions are not active. Further, core network nodes may not be aware of the quality of service (QoS) that can be provided by a particular AP at a given point in time, the sleep schedules of M2M devices, the caching ability of the AP, the number of M2M requests that can be buffered by the AP, or the mobility patterns of M2M devices. In LTE/3G networks, the random access procedure for network access (i.e., RACH for initial access) may also be a factor that limits the number of simultaneous active M2M devices that a wireless AP can support.

Additional constraints for WiFi M2M networks that impact network-wide performance decisions may also exist. WiFi APs/wireless LAN controllers (WLCs) can support a limited number of devices or active sessions. Some M2M devices may send a low amount of infrequent data while some M2M devices may send a large amount of data (such as video surveillance cameras). WiFi APs may also have high overhead due to control plane signaling (including security mechanisms). With 802.1x, the security context is kept only for a certain duration of time and may need to be created again when an M2M device wakes up the next time. Further, core network nodes (such as mobility gateways) may not be aware of the sleep schedules of M2M devices, the caching ability of the AP/WLC, the number of M2M requests that can be buffered by the AP/WLC, or the mobility patterns of M2M devices.

Efficient methods are needed in wireless networks to avoid such issues in these networks such as LTE/3G/2G/WiFi M2M networks. Existing procedures exist but suffer from a number of limitations. One existing procedure is to randomize M2M requests at M2M servers/service platforms if possible (such as for delay tolerant M2M requests). However, even if M2M servers randomize requests, it may still result in very high control (or data) plane load in the network at certain instants as M2M service platforms are deployed by different vendors (and they are only doing local randomization). In such situations, additional mechanisms are needed to control traffic peaks in the network.

Another existing procedure is the use of an access network discovery and selection function (ANDSF) as described by 3GPP TS 24.312. The purpose of the ANDSF is to assist user equipment (UE) to discover non-3GPP access networks that can be used for data communications in addition to 3GPP access networks and to provide the UE with rules policing the connection to these networks. However, ANDSF suffers from a number of limitations. ANDSF is meant for cellular-WiFi types of multimode devices and does not work well for single-mode LTE (or 3G) "only" M2M device in which it may be desired for an LTE (3G) M2M device to select the right LTE (3G) AP based on desired criteria as further described herein. In addition, ANDSF is relatively static and doesn't really take into account changing traffic dynamics at different nodes (such as routers, APs) in the network. It is desirable to use more dynamic mechanisms to solve the problems described herein. For example, if a large number of single-mode LTE (or 3G) M2M devices try to establish a session with an LTE (or 3G) AP, that results in increased overhead (such as due to random access procedures, synchronization procedures, signaling for session management and security aspects, data plane overhead once control plane access is granted and other factors). This limits the number of M2M (and non-M2M) devices that can be connected in these networks. Several of these factors depend on dynamic conditions in the network and ANDSF doesn't address this dynamism. In addition, ANDSF uses Open Mobile Alliance (OMA) Device Management (DM) that typically runs over transmission control protocol (TCP). Transport Layer Security (TLS) is used for security purposes between the ANDSF server and the UE. Many M2M devices support lightweight protocols only and may not even support OMA DM in its current form.

Another existing procedure is the current reselection mechanism of the LTE/3G UE. However, this procedure is based more on signal strength received by the UE (from different APs) and does not consider the issues described herein especially for cases when a large number of M2M devices try to communicate with these APs. In addition, current reselection mechanisms don't consider dynamic load conditions at upstream routers/gateways (and downstream M2M Gateways) in the network. For example, a 3G M2M device may be able to communicate with different 3G APs and the path from these 3G APs to the M2M service platform may go via different routers. In this case, it is desired to select an appropriate "3G AP—router/gateway—M2M service platform" path that "reselection" mechanisms alone don't provide.

Another existing procedure is the use of handover and load balancing mechanisms when an M2M device is in active state and communicating data with the network. However, these are not used when the M2M device is trying to establish a session with the network (e.g. the random access procedure in 3GPP networks or CSMA/CA in WiFi networks).

In accordance with various embodiments, traffic management/analysis module 112 is configured to receive resource indicators from one or more of wireless APs 102a-102g indicative of the available resources of the respective wireless AP and utilize the resource indicators to provide network access selection enhancements to assist a particular M2M device 102a-102g in selecting a particular wireless AP 104a-104h as will be further described herein.

Figure 2:
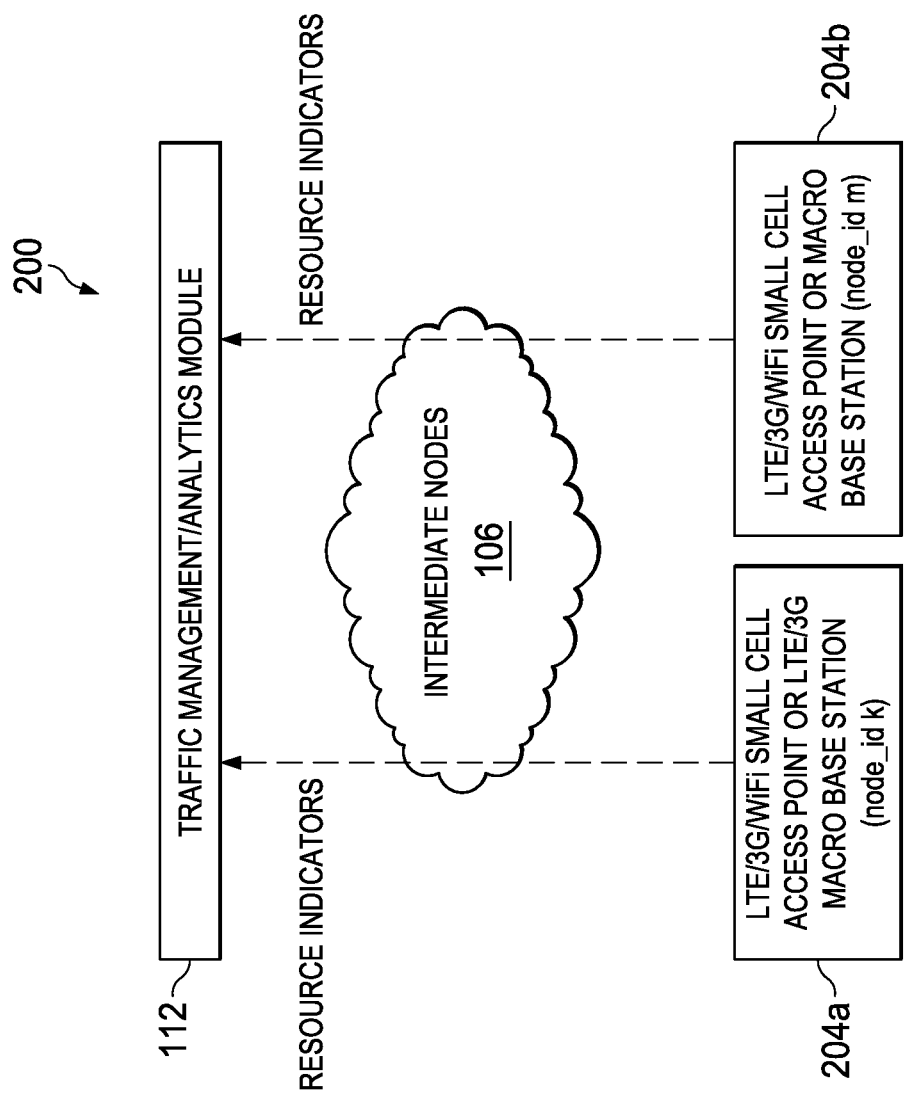
FIG. 2 is a simplified block diagram of a communication system including a traffic management/analytics module for providing network assisted access network selection for a machine-to-machine wireless network environment in accordance with one embodiment of the present disclosure.

Referring now to FIG. 2, FIG. 2 is a simplified block diagram of a communication system 200 including a traffic management/analytics module 112 for providing network assisted access network selection for a machine-to-machine wireless network environment in accordance with one embodiment of the present disclosure. Communication system 200 includes a first wireless AP 204a and a second wireless AP 204b in communication with traffic management module 112 via intermediate nodes 106. In particular embodiments, one or more of first wireless AP 204a and second wireless AP 204b may be a LTE/3G/WiFi small cell AP or LTE/3G macro base station.

In accordance with one or more embodiments, each of first wireless AP 204a and second wireless AP 204b is configured to send resource indicators and/or other contextual information indicative of particular resource capabilities of the particular wireless AP to traffic management/analytics module 112. After receiving the resource indicators from each of first wireless AP 204a and second wireless AP 204b, traffic management/analytics module 112 may utilize this information to assist M2M devices in selecting a particular wireless AP to utilize for network communication as will be further described herein.

In one or more embodiments, the resource indicators include an indication of the additional number of M2M devices that a wireless AP can support within a predetermined time interval (t, t+T) where T≥0, from a control plane perspective. This indication may be designated as num_additional_devices (node_id j, t, t+T)=the number of additional M2M devices that the wireless AP having a node ID j can support during the time interval (t, t+T) where T≥0. In one or more embodiments, the wireless AP may make an assessment of how many more devices that the wireless AP can support within that predetermined time period. For example, assuming a predetermined time period of one minute for a wireless AP that can support sixty (60) devices in total and is already supporting thirty (30) devices, the wireless AP may report a num_additional_devices indicating that the wireless AP can support an additional thirty (30) devices during the next one minute time period.

It should be noted that in a particular embodiment in which T=0 allows a wireless AP to inform of the additional devices that it can support at that time t and does not make it necessary for the wireless AP to provide an estimate for a non-zero time interval. This indicator provides a control plane perspective whereas the data plane perspective is captured indirectly in the QoS violation and CPU load factors further described below.

The resource indicators may further include in some embodiments an indication of the hardware load of the wireless AP at predetermined time t. This indicator may be designated as HW_load_indicator (node_id j, t)=the hardware load at a wireless AP having a node ID j at a time t. The hardware load indicator provides an indication of the current hardware load on the wireless AP (or base station). In particular embodiments, the wireless AP may take into account such factors as the processing power of the CPU of the wireless AP, the bandwidth capabilities of the wireless AP, etc. In particular embodiments, the hardware load indicator, HW_load_indicator (node_id j, t), may be indicated by a value indicative of either a low, medium, or high load upon the wireless AP.

The resource indicators may further include in some embodiments an indication of the fraction of flows for which a quality of service (QoS) requirement was violated considering the flows traversing through that wireless AP belonging to a particular QoS class c. The time interval for QoS violation is indicated as (t,t−δ), 0<δ<t. This indicator may be designated as frac_qos_viol(node_id, qos_class, t, δ)=the fraction of flows for which QoS was violated during time interval (t,t−δ), 0<δ<t, while packets of that flow traversed a wireless AP having a particular node ID. Consider a class of flows that have QoS requirements for data rate of flows traversing the particular AP. A flow, f, is considered to have its QoS requirements violated while passing through an AP if $$\frac{\text{actual\_bytes\_served}(f; t, t-\delta)}{\text{required\_bytes\_to\_be\_served}(f; t, t-\delta)} < 1$$

Here, actual_bytes_served(f; t,t−δ), is the number of bytes served for flow f by that wireless AP during time interval (t,t−δ), 0<δ<t, and required_bytes_to_be_served (f; t,t−δ) is the number of bytes required to be served during time interval (t,t−δ), 0<δ<t as per the rate requirement of that flow. The wireless AP is specifically considered here as that is typically the bottleneck point for an end-to-end traffic flow scenario. It should be noted that it may or may not result in an end-to-end rate violation of that flow as it also depends upon what happens at other nodes that flow f traverses through. However, this measurement indicates whether or not flows with rate requirements are getting their required rate at that specific wireless AP hop. It also indirectly indicates load at that wireless AP and channel conditions experienced by existing user devices (e.g., M2M devices) that are communicating with this wireless AP. If there is rate violation for a high number of flows, it could occur because that wireless AP is heavily loaded and/or if user devices communicating with that wireless AP are experiencing very bad channel conditions. In particular embodiments, frac_qos_viol, can be computed in a similar manner for 3G and WiFi APs. From the value of frac_qos_viol, the wireless AP may determine a value of the indicator sent to traffic management/analytics module 112. Table 1 shows an example 4-step approach for determining frac_qos_viol_indicator(node_id, qos_class, t, δ) from frac_qos_viol(node_id, qos_class, t, δ). In still other embodiments, an n-step approach may be used in which n≥4.

TABLE 1

| frac_qos_viol_indicator from frac_qos_viol using 4-step approach | |
|---|---|
| frac_qos_viol | frac_qos_viol_indicator |
| 0 ≤ frac_qos_viol() < 25% | 1 |
| 25% ≤ frac_qos_viol() < 50% | 2 |
| 50% ≤ frac_qos_viol() < 75% | 3 |
| frac_qos_viol() ≥ 75% | 4 |

It should be noted that Note that frac_qos_viol_indicator may be important even in the presence of HW_load_indicator. For example, a scenario may exist in which HW_load_indicator (indicating utilization of HW resources of a wireless AP such as CPU, memory, bus bandwidth etc.) is "medium" but frac_qos_viol_indicator could be even "high". This may occur because there may be many devices communicating via that wireless AP that may be experiencing quite bad channel conditions. Once channel conditions experienced by these devices improve, the wireless AP may need to provide additional hardware resources to enable these devices to obtain their required QoS over a certain time duration.

Upon receiving the resource indicators, i.e., num_additional_devices, HW_load_indicator, and frac_qos_viol_indicator from one or more wireless APs that provide connectively to M2M devices, traffic management/analytics module 112 maintains the resource indicators within a context table. An example of a context table maintained by traffic management/analytics module 112 is shown in Table 2. The context table of Table 2 stores resource indicators for each of three wireless APs (m1, m2, m3) including a node ID containing an identifier of the wireless AP, an indication of the RAT supported by the wireless AP, number_additional_devices, frac_qos_viol_indicator, and HW_load_indicator. Examples of identifiers that may be used for node id include an IP address, a 3GPP identifier, an IEEE 802 identifier, or any other suitable wireless AP identifier.

Figure 3:
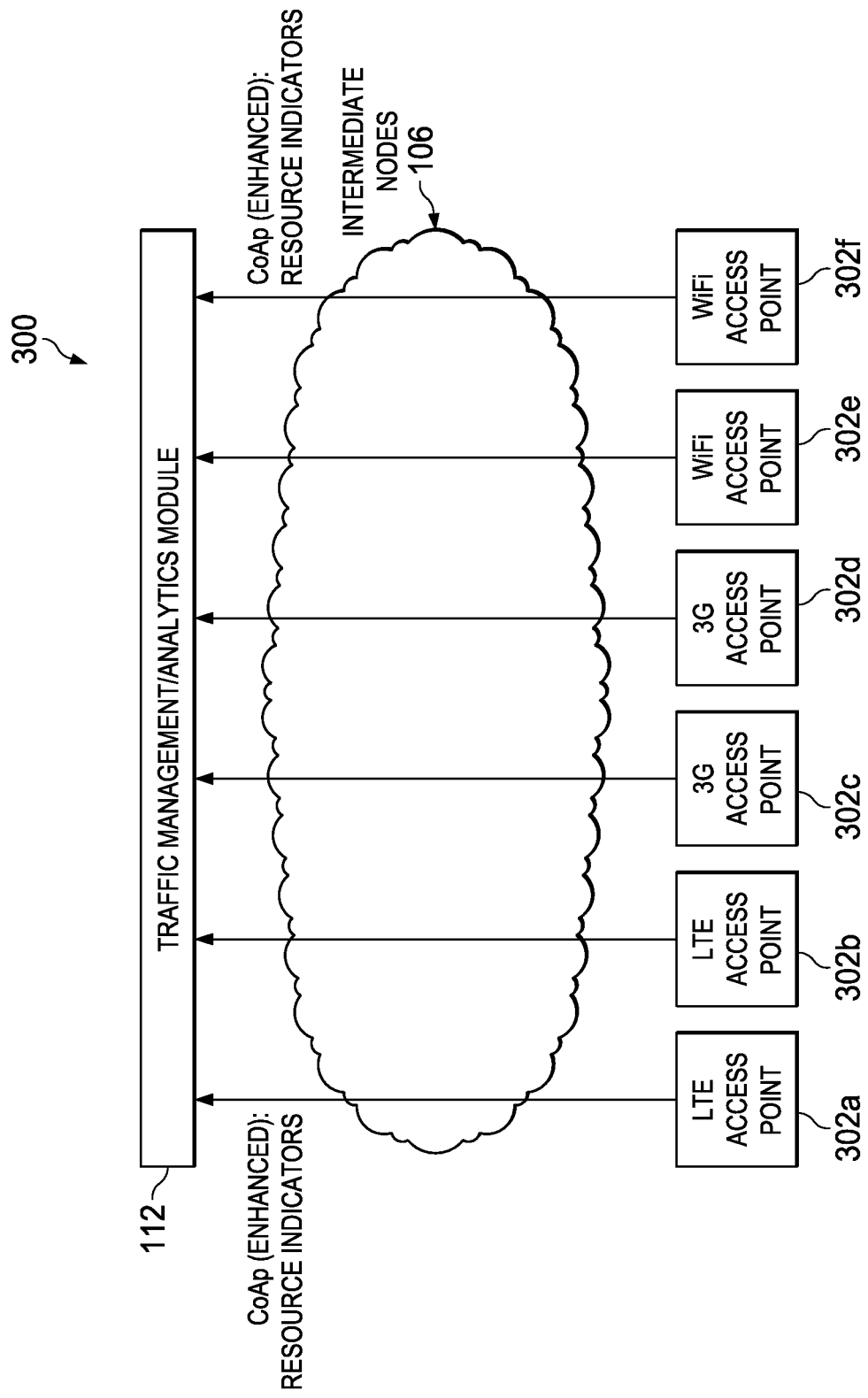
FIG. 3 is a simplified block diagram of direct communication of resource indicators from wireless APs to the traffic management/analytics module in accordance with one embodiment of the present disclosure.

Referring now to FIG. 3, FIG. 3 is a simplified block diagram 300 of direct communication of resource indicators from wireless APs to traffic management/analytics module 112 in accordance with one embodiment of the present disclosure. In the embodiment of FIG. 3, a first LTE AP 302a, a second LTE AP 302b, a first 3G AP 302c, a second 3G AP 302d, a first WiFi AP 302e, and second WiFi AP 302f each communicate resource indicators including num_additional_devices, HW_load_indicator, and frac_qos_viol_indicator to traffic management/analytics module 112 via intermediate nodes 112. In the embodiment of FIG. 3, an enhanced Constrained Application Protocol (CoAP) protocol is used to communicate the resource indicators from the wireless APs to traffic management/analytics module 112. Constrained Application Protocol (CoAP), as being defined in the IETF's CORE group, is an implementation of RESTful architecture and can be used for end-to-end communication. Loosely speaking, it is a lightweight version of HTTP for constrained networks though it offers new capabilities that are needed for M2M applications. CoAP is an application layer protocol that is intended for use in resource-constrained internet devices and makes use of two message types, requests and responses, using a simple binary base header format. The base header may be followed by options in an optimized Type-Length-Value format. In particular embodiments, the CoAP protocol is enhanced to carry the resource indicators described herein.

In one particular embodiment in which CoAP is used to communicate the resource indicators from the wireless APs to traffic management/analytics module 112, the CoAP Observe option is used to communicate the resource indicators.

Figure 4:
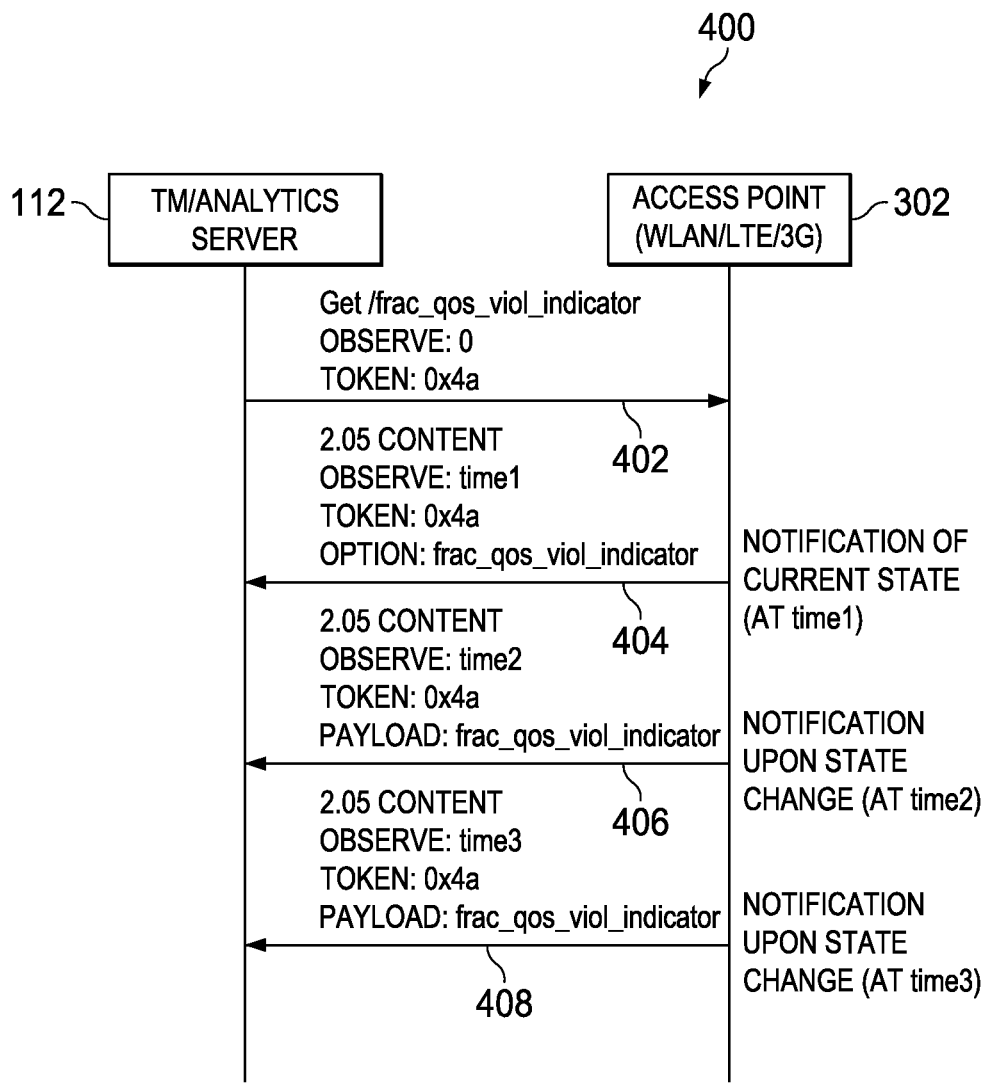
FIG. 4 is a simplified flow diagram of communication of a resource indicator from the wireless APs to the traffic management/analytics module in accordance with one embodiment of the present disclosure.

Referring now to FIG. 4, FIG. 4 is a simplified flow diagram 400 of communication of a frac_qos_viol_indicator resource indicator from wireless APs to traffic management/analytics module 112 using CoAP in accordance with one embodiment of the present disclosure. In 402, traffic management/analytics module 112 sends a request to receive

TABLE 2

| Node Id (AP id) | RAT supported | num_additional_devices Number of additional devices that this node (AP) can support at time t, during a time interval (t, t + T) | frac_qos_viol_indicator (node_id m, qos_class c, t, δ) Fraction of flows which QoS was violated at AP _id m for QoS class c during time interval (t, t-δ), δ > 0 | HW_load_indicator |
|---|---|---|---|---|
| m1 (AP) | LTE | num_additional_devices (node_id m1, t, T) | frac_qos_viol_indicator (node_id m1, qos_class c, t, δ) | HW_load_indicator(node_id m1, t) |
| m2 (AP) | 3G | num_additional_devices (node_id m2, t, T) | frac_qos_viol_indicator (node_id m2, qos_class c, t, δ) | HW_load_indicator(node_id m2, t) |
| m3 (AP) | WiFi | num_additional_devices (node_id m3, t, T) | frac_qos_viol_indicator (node_id m3, qos_class c, t, δ) | HW_load_indicator(node_id m3, t) |

Node id = identification type, value
identification type: IP address, 3GPPP identifier, IEEE802 identifier...
node_id: Node id with identifier type = IP address or a 3GPPP identifier In particular embodiments, traffic management/analytics module 112 may use these resources indicators as well as optionally other parameters to run algorithms to assist M2M devices in determining to which particular wireless APs to establish connectivity as will be further described herein. In particular embodiments, the resource indicators may be provided via Constrained Application Protocol (CoAP), an extension of an existing cellular/WiFi/wireline communication protocol, or a custom protocol.

a frac_qos_viol_indicator resource indicator from a particular wireless AP 302 (such as a WLAN, LTE, or 3G AP) using a CoAP Observe message having an option including content of Get/frac_qos_viol_indicator, Observe: 0, and Token: 0x4a. In response to receiving the request, wireless AP 302 notifies traffic management/analytics module 112 of frac_qos_viol_indicator based upon one or more policies. For example, wireless AP 302 may notify traffic management/analytics module 112 whenever a change in frac_qos_viol is above a predetermined threshold. In an alternative embodiment, wireless AP 302 may notify traffic management/analytics module 112 of frac_qos_viol_indicator periodically.

In 404, wireless AP 302 sends a notification of the current state of frac_qos_viol_indicator at a time of time1 using a CoAP Observe message having an option including content of Observe: time1, Token: 0x4a, and a payload of frac_qos_viol_indicator. In 406, wireless AP 302 sends a notification of the state of frac_qos_viol_indicator at a time of time2 using a CoAP Observe message having an option including content of Observe: time2, Token: 0x4a, and a payload of frac_qos_viol_indicator. In 408, wireless AP 302 sends a notification of the current state of frac_qos_viol_indicator at a time of time3 using a CoAP Observe message having an option including content of Observe: time3, Token: 0x4a, and a payload of frac_qos_viol_indicator.

Figure 5:
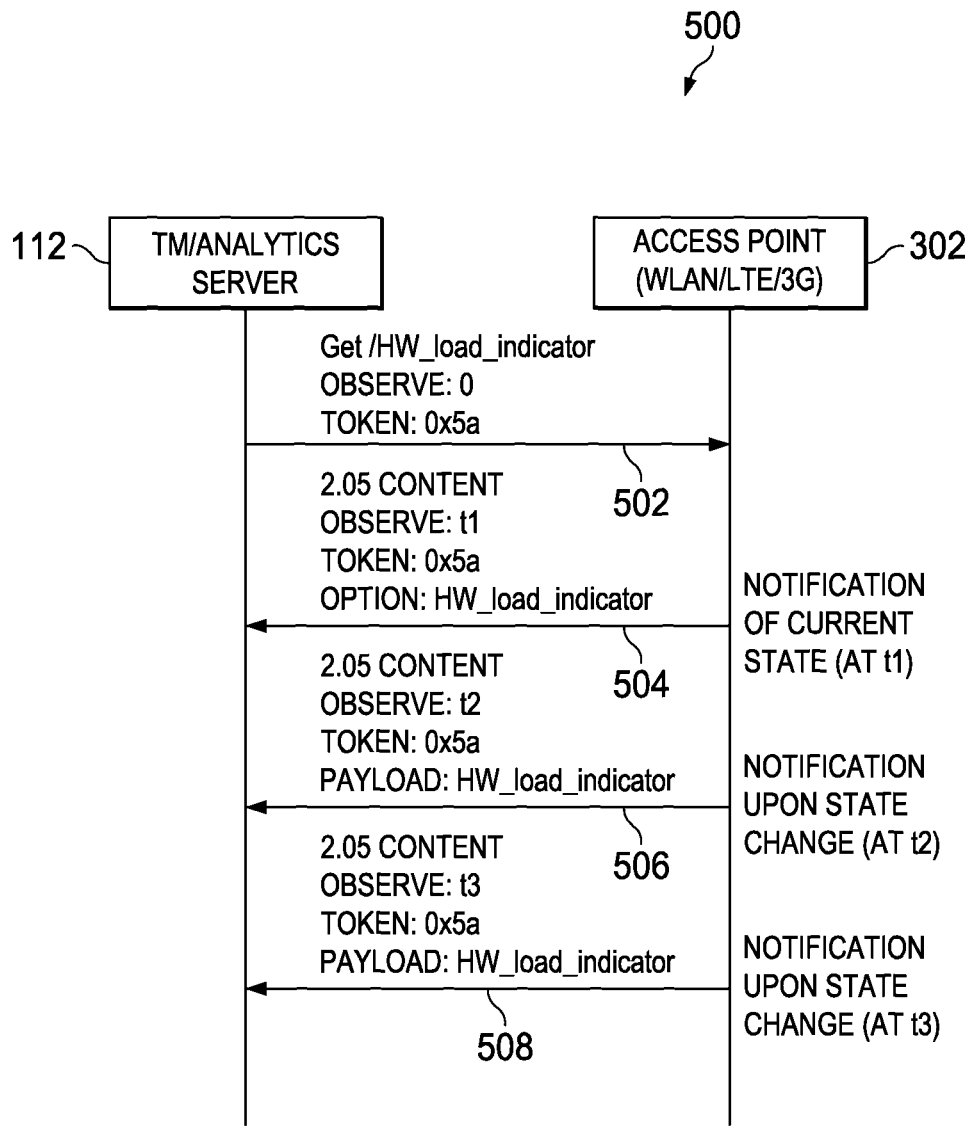
FIG. 5 is a simplified flow diagram of communication of another resource indicator from the wireless APs to the traffic management/analytics module in accordance with one embodiment of the present disclosure.

Referring now to FIG. 5, FIG. 5 is a simplified flow diagram 500 of communication of a HW_load_indicator resource indicator from wireless APs to traffic management/analytics module 112 using CoAP in accordance with one embodiment of the present disclosure. In 502, traffic management/analytics module 112 sends a request to receive a HW_load_indicator resource indicator from a particular wireless AP 302 using a CoAP Observe message having an option including content of Get/HW_load_indicator, Observe: 0, and Token: 0x5a. In response to receiving the request, wireless AP 302 notifies traffic management/analytics module 112 of HW_load_indicator based upon one or more policies. For example, wireless AP 302 may notify traffic management/analytics module 112 whenever a change in HW_load_indicator is above a predetermined threshold. In an alternative embodiment, wireless AP 302 may notify traffic management/analytics module 112 of HW_load_indicator periodically.

In 504, wireless AP 302 sends a notification of the current state of HW_load_indicator at a time of time1 using a CoAP Observe message having an option including content of Observe: time1, Token: 0x5a, and a payload of HW_load_indicator. In 506, wireless AP 302 sends a notification of the state of HW_load_indicator at a time of time2 using a CoAP Observe message having an option including content of Observe: time2, Token: 0x5a, and a payload of HW_load_indicator. In 508, wireless AP 302 sends a notification of the current state of HW_load_indicator at a time of time3 using a CoAP Observe message having an option including content of Observe: time3, Token: 0x5a, and a payload of HW_load_indicator.

Figure 6:
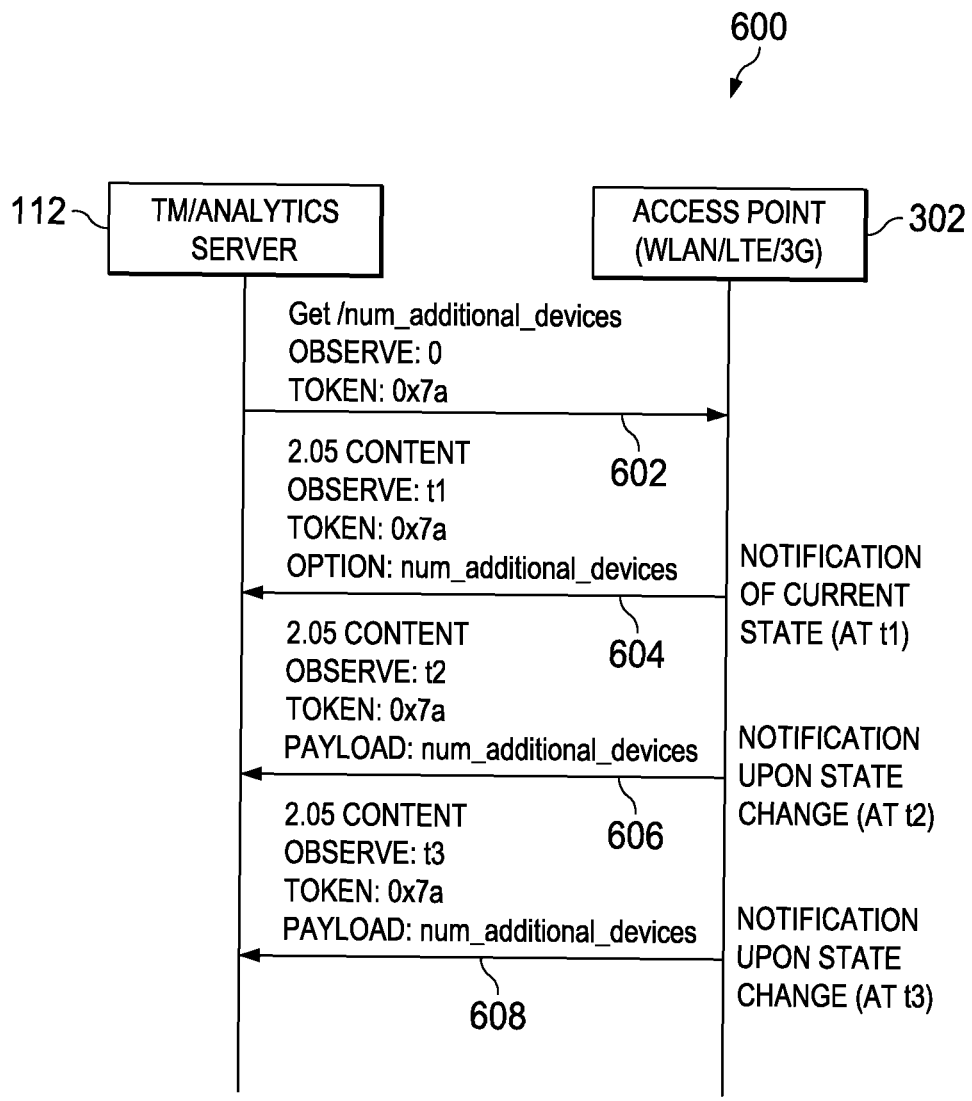
FIG. 6 is a simplified flow diagram of communication of another resource indicator from the wireless APs to the traffic management/analytics module in accordance with one embodiment of the present disclosure.

Referring now to FIG. 6, FIG. 6 is a simplified flow diagram 600 of communication of a num_additional_devices resource indicator from wireless APs to traffic management/analytics module 112 using CoAP in accordance with one embodiment of the present disclosure. In 602, traffic management/analytics module 112 sends a request to receive a num_additional_devices resource indicator from a particular wireless AP 302 using a CoAP Observe message having an option including content of Get/num_additional_devices, Observe: 0, and Token: 0x7a. In response to receiving the request, wireless AP 302 notifies traffic management/analytics module 112 of num_additional_devices based upon one or more policies. For example, wireless AP 302 may notify traffic management/analytics module 112 whenever a change in num_additional_devices is above a predetermined threshold. In an alternative embodiment, wireless AP 302 may notify traffic management/analytics module 112 of num_additional_devices periodically.

In 604, wireless AP 302 sends a notification of the current state of num_additional_devices at a time of time1 using a CoAP Observe message having an option including content of Observe: time1, Token: 0x7a, and a payload of num_additional_devices. In 606, wireless AP 302 sends a notification of the state of num_additional_devices at a time of time2 using a CoAP Observe message having an option including content of Observe: time2, Token: 0x7a, and a payload of num_additional_devices. In 608, wireless AP 302 sends a notification of the current state of num_additional_devices at a time of time3 using a CoAP Observe message having an option including content of Observe: time3, Token: 0x7a, and a payload of num_additional_devices.

Referring now to FIG. 7, FIG. 7 is a diagram of a CoAP packet 700 for communicating resource indicators from wireless APs to traffic management/analytics module 112 in accordance with one embodiment of the present disclosure. As an alternative to the embodiments described in FIG. 4-6, FIG. 7 illustrates adding a new CoAP Option field 702 including the frac_qos_viol_indicator, HW_load_indicator, and num_additional_devices resource indicators being included within the same CoAP packet 700. In particular embodiments, this may reduce overhead as these resource indicators may be piggybacked on other CoAP messages.

Referring now to FIG. 8, FIG. 8 illustrates an example embodiment of CoAP option formats for conveying the resource indicators in option field 702 of the CoAP packet 700 of FIG. 7. In the embodiment of FIG. 8, the additional_number_devices option 802 is an integer having a length of 2 bytes, the HW_load_indicator option 804 is an integer having a length of 1 byte, and frac_qos_viol_indicator option 806 is an integer having a length of 1 byte.

Figure 9:
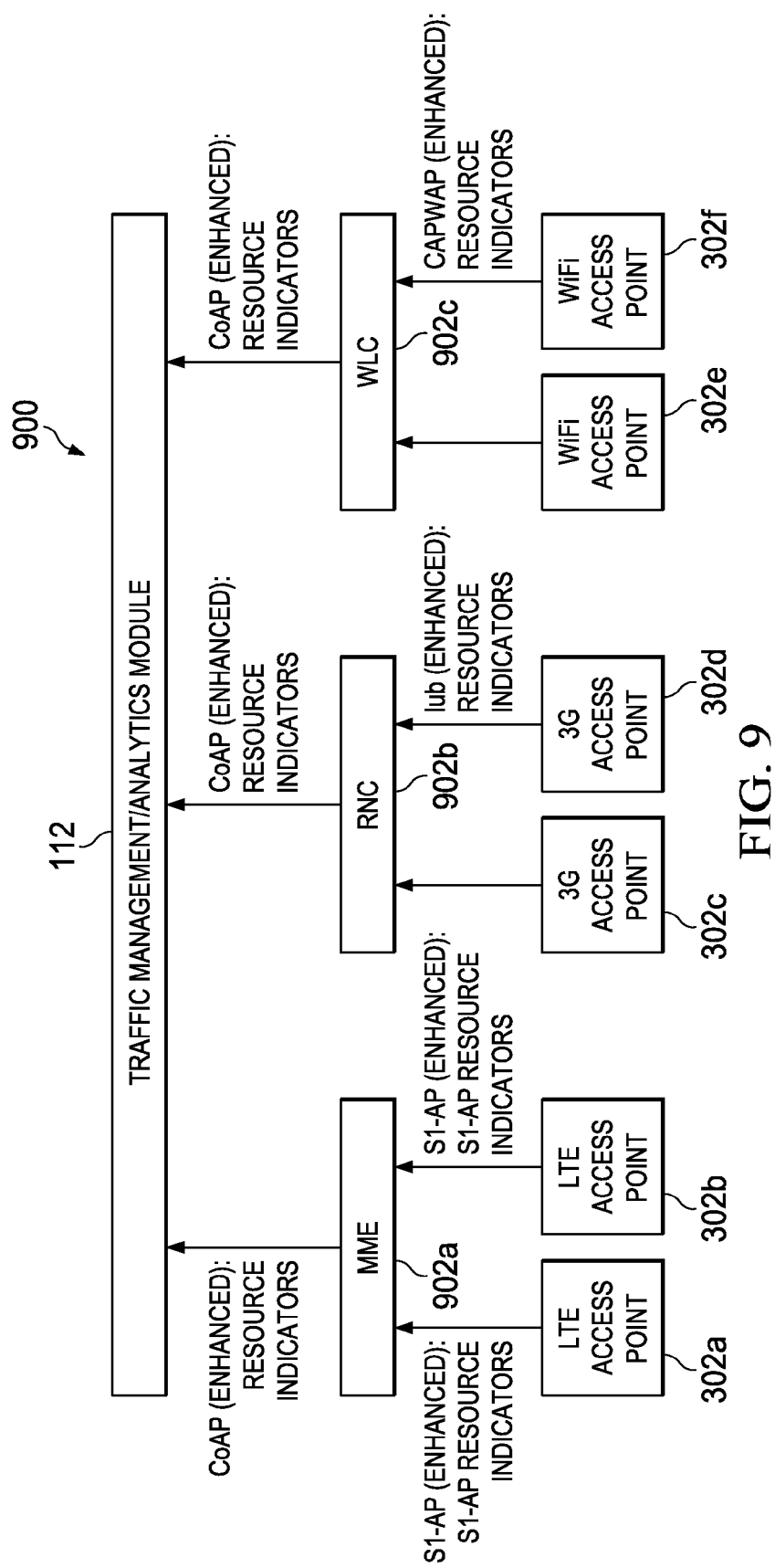
FIG. 9 is a simplified block diagram of communication of resource indicators from the wireless APs to traffic management/analytics module via one or more network controllers in accordance with one embodiment of the present disclosure.

Referring now to FIG. 9, FIG. 9 is a simplified block diagram 900 of communication of resource indicators from wireless APs to traffic management/analytics module 112 via one or more network controllers in accordance with one embodiment of the present disclosure. In the embodiment of FIG. 9, first LTE AP 302a and second LTE AP 302b are in communication with a first network controller 902a such as a Mobility Management Entity (MME). First network controller 902a is in further communication with traffic management/analytics module 112. First 3G AP 302c and second 3G AP 302d are in communication with a second network controller 902b such as a Radio Network Controller (RNC). Second network controller 902b is in further communication with traffic management/analytics module 112. First WiFi AP 302e and second WiFi AP 302f are in communication with a third network controller 902c such as a wireless LAN controller (WLC). Third network controller 902c is in further communication with traffic management/analytics module 112.

In the embodiment of FIG. 9, first LTE AP 302a and second LTE AP 302b each communicate resource indicators including num_additional_devices, HW_load_indicator, and frac_qos_viol_indicator to first network controller (MME) 902a, first 3G AP 302c and second 3G AP 302d each communicate resource indicators including num_additional_devices, HW_load_indicator, and frac_qos_viol_indicator to second network controller (RNC) 902b, and first WiFi AP 302e, and second WiFi AP 302f each communicate resource indicators including num_additional_devices, HW_load_indicator, and frac_qos_viol_indicator to third network controller (WLC) 902c. First network controller (MME) 902a, second network controller (RNC) 902b, and third network controller (WLC) 902c are configured to communicate the resource indicators received from the respective wireless APs 302a-302f to traffic management/analytics module 112.

In the embodiment of FIG. 9, first LTE AP 302a and second LTE AP 302b convey the resource indicator values to first network controller (MME) 902*a* using an enhanced S1 application protocol (S1-AP) message. Table 3 describes a new S1-AP resource status message according to at least one embodiment and differences between an existing X2-AP resource message as described in 3GPP TS 36.423 and the new S1-AP option.

TABLE 2

| Existing X2-AP and New S1-AP message | | Source → Dest node | Brief description |
| --- | --- | --- | --- |
| Existing message in 3GPP 36.423 | X2-AP Resource Status | From one eNodeB → another eNodeB | eNode—eNodeB / X2: Hardware Load Indicator, Radio Resource Indicator |
| New message in this document | S1-AP Resource Status | From eNodeB →MME | HW load indicator  New resource indicators: Number of additional devices that can be supported by that AP, Fraction of flows for which QoS was violated |

As shown in Table 3, the existing X2-AP resource status message as described in 3GPP 36.423 allows one eNodeB to convey a hardware load indicator and radio resource indicator to another eNodeB. The new S1-AP as described according to at least one embodiment allows an AP (such as an eNodeB) to convey a hardware load indicator, an indicator of a number of additional devices that can be supported by that AP, and an indicator of a fraction of flows associated with the AP for which QoS was violated to a network controller (such as an MME). In a particular embodiment, LTE AP 302*a* and LTE 302*b* may send the S1-AP message including the resource indicators to first network controller (MME) 902*a*, and first network controller (MME) 902*a* may send an S1-AP resource indicators acknowledgement to each of LTE AP 302*a* and LTE 302*b* to confirm receipt of the resource indicators. In still another particular embodiment, first network controller (MME) 902*a* may send an S1-AP resource indicators request message to each of LTE AP 302*a* and LTE 302*b*, and each of LTE AP 302*a* and LTE 302*b* may send an S1-AP resource indicators response message including the requested resource indicators to first network controller (MME) 902*a*. First network controller (MME) 902*a* is further configured to communicate the resource indicators received from LTE AP 302*a* and LTE 302*b* to traffic management/analytics module 112 using an enhanced CoAP protocol as previously described herein.

In the embodiment of FIG. 9, first 3G AP 302*c* and second 3G AP 302*d* are configured to convey the resource indicators to second network controller (RNC) 902*b* using an enhanced Iub message. Iub is a 3GPP interface used to convey information between a 3G AP and an RNC. In accordance with a particular embodiments, an Iub message is enhanced to include the resource indicators. Second network controller (RNC) 902*b* is further configured to communicate the resource indicators received from 3G AP 302*c* and 3G 302*d* to traffic management/analytics module 112 using an enhanced CoAP protocol as previously described herein.

In the embodiment of FIG. 9, first WiFi AP 302*e* and second WiFi AP 302*f* are configured to convey the resource indicators to third network controller (WLC) 902*c* using an enhanced Control And Provisioning of Wireless Access Points (CAPWAP) protocol. The CAPWAP protocol is a standard, interoperable networking protocol that enables a central wireless LAN Access Controller to manage a collection of wireless APs and is described in RFC 5415. Third network controller (WLC) 902*c* is further configured to communicate the resource indicators received from WiFi AP 302*e* and WiFi 302*f* to traffic management/analytics module 112 using an enhanced CoAP protocol as previously described herein.

Figure 10:
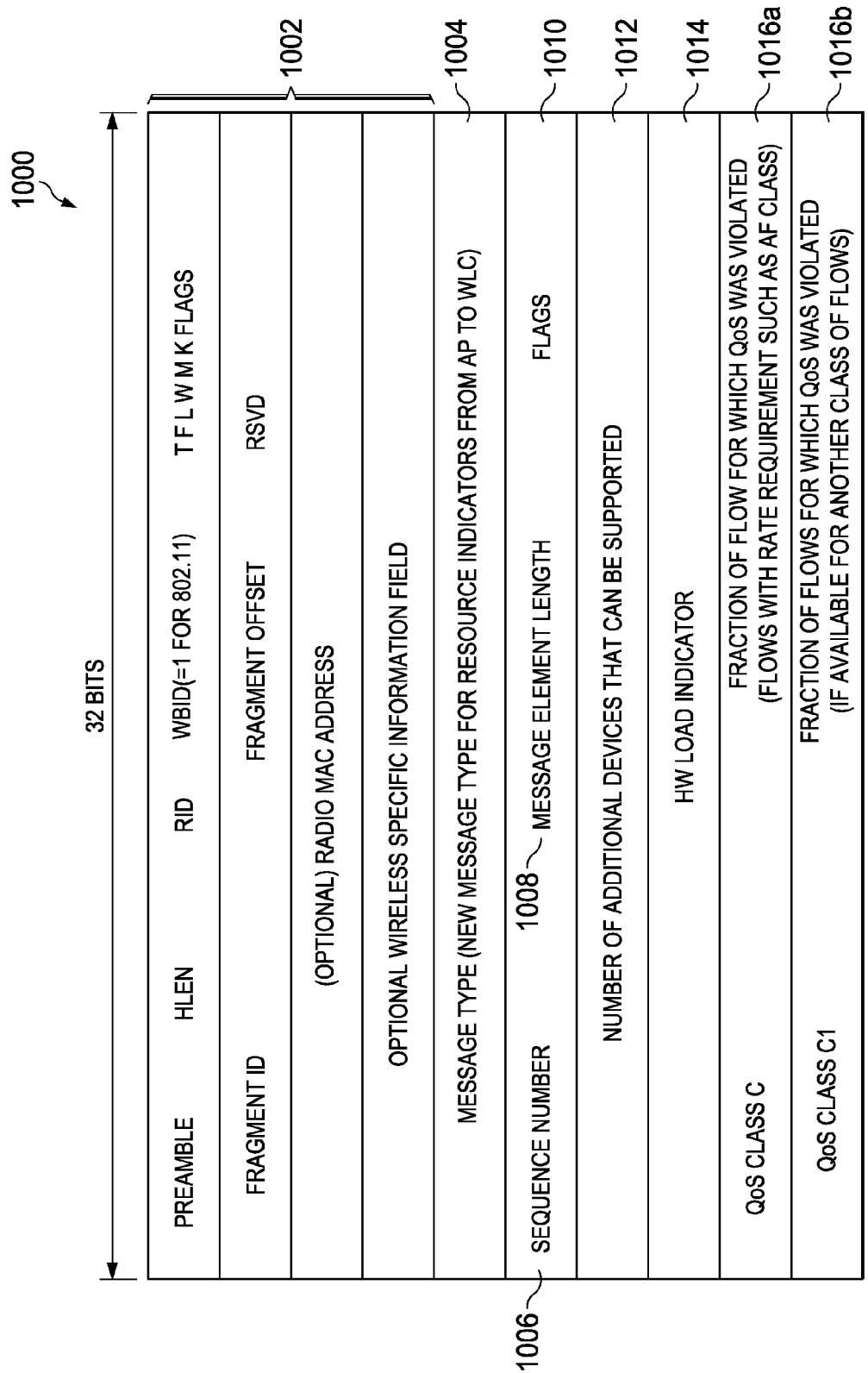
FIG. 10 illustrates an example embodiment of a resource indicator message for sending resource indicators from an access point to a wireless LAN controller.

Referring now to FIG. 10, FIG. 10 illustrates an example embodiment of a CAPWAP (The Control and Provisioning of Wireless Access Point) resource indicator message 1000 for sending resource indicators from an access point to a wireless LAN controller. CAPWAP resource indicator message 1000 includes standard CAPWAP fields 1002 (as in IETF RFC 5415 and RFC 5416). Standard CAPWAP fields 1002 may include a preamble, a header length (HLEN) field, a RID field, a WBID field, one or more flags, a fragment ID field, a fragment offset field, an RSVD field, an optional radio MAC address field, and an optional wireless Specific Information Field. CAPWAP resource message 1000 further includes a Message Type field 1004 having an indication of a new message type for resource indicators from AP to WLC, a sequence number message length field 1006, a message element length field 1008, and one or more flags 1010. CAPWAP resource message 1000 further includes a field 1012 including an indication of the number of additional devices that the AP can support, and a field 1014 including a hardware load indicator indicating the hardware load of the AP. CAPWAP resource message 1000 further includes a first QoS violation indicator field 1016*a* including an indication of the fraction of flows for which QoS was violated for a first class of flows "QoS class c", and second QoS violation indicator field 1016*b* including an indication of the fraction of flow for which QoS was violated for a second class of flows "QoS class c1". Although the particular example illustrated in FIG. 10 includes two QoS violation indicator fields, it should be understood that in other examples CAPWAP resource message 1000 may be configured to include one or more QoS violation indicator fields. In still other embodiments, CoAP based methods may be used to send resource indicators from first WiFi AP 302*e* and second WiFi AP 302*f* to third network controller (WLC) 902*c*.

In one particular embodiment in which CoAP is used to communicate the resource indicators from the network controllers 902*a*-902*c* (e.g., MME/RNC/WLC) to traffic management/analytics module 112, the CoAP Observe option is used to communicate the resource indicators.

Figure 11:
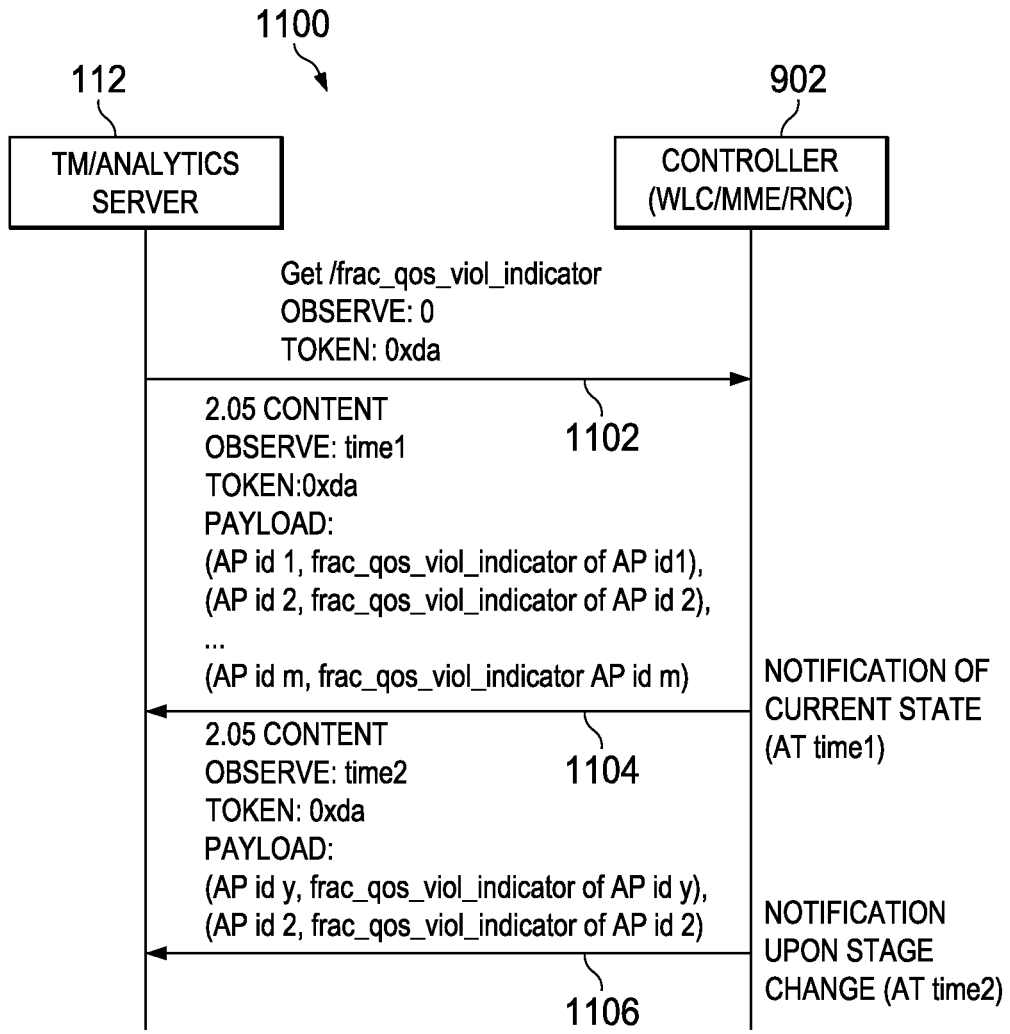
FIG. 11 is a simplified flow diagram of communication of resource indicators associated with one or more wireless APs from a network controller to the traffic management/analytics module in accordance with one embodiment of the present disclosure.

Referring now to FIG. 11, FIG. 11 is a simplified flow diagram 1100 of communication of frac_qos_viol_indicator resource indicators associated with one or more wireless APs from a network controller 302 (such as one or more of network controllers 902*a*-902*c*) to traffic management/analytics module 112 using CoAP in accordance with one embodiment of the present disclosure. In 1102, traffic management/analytics module 112 sends a request to receive one or more frac_qos_viol_indicator resource indicators from a particular network controller 302 (such as an MME, RNC, or WLC) using a CoAP Observe message having an option including content of Get/frac_qos_viol_indicator, Observe: 0, and Token: 0xda. In response to receiving the request, controller 902 notifies traffic management/analytics module 112 of the one or more frac_qos_viol_indicator resource indicator based upon one or more policies. For example, network controller 902 may notify traffic management/analytics module 112 whenever a change in frac_qos_viol is above a predetermined threshold. In an alternative embodiment, network controller 902 may notify traffic management/analytics module 112 of frac_qos_viol_indicator periodically.

In 1104, network controller 902 sends a notification of the current state of frac_qos_viol_indicator for a number of APs (AP id 1-AP id m) at a time of time1 using a CoAP Observe message having an option including content of Observe: time1, Token: 0x4a, and a payload of frac_qos_viol_indicator resource indicators for APs having AP id 1 to AP id m). In 1106, network controller 902 sends a notification of a state change of frac_qos_viol_indicator resource indicators for an AP id y and an AP id 2 at a time of time2 using a CoAP Observe message having an option including content of Observe: time2, Token: 0xda, and a payload of frac_qos_viol_indicator for AP id y and an AP id 2.

Figure 12:
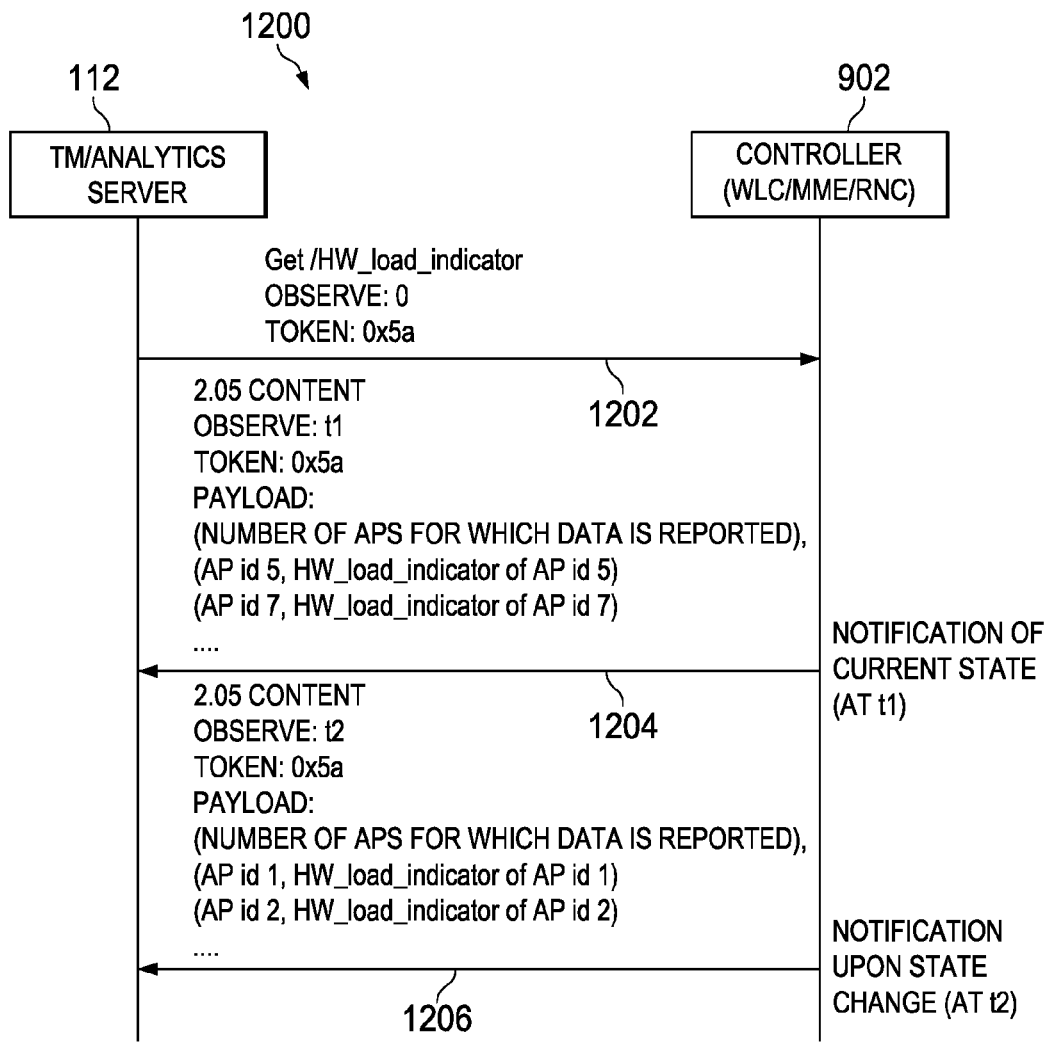
FIG. 12 is a simplified flow diagram of communication of another resource indicator from the network controllers to the traffic management/analytics module in accordance with one embodiment of the present disclosure.

Referring now to FIG. 12, FIG. 12 is a simplified flow diagram 1200 of communication of a HW_load_indicator resource indicator from network controllers to traffic management/analytics module 112 using CoAP in accordance with one embodiment of the present disclosure. In 1202, traffic management/analytics module 112 sends a request to receive a HW_load_indicator resource indicator from a particular network controller 902 using a CoAP Observe message having an option including content of Get/HW_load_indicator, Observe: 0, and Token: 0x5a. In response to receiving the request, network controller 902 notifies traffic management/analytics module 112 of HW_load_indicator based upon one or more policies. For example, network controller 902 may notify traffic management/analytics module 112 whenever a change in HW_load_indicator is above a predetermined threshold. In an alternative embodiment, network controller 902 may notify traffic management/analytics module 112 of HW_load_indicator periodically.

In 1204, network controller 902 sends a notification of the current state of HW_load_indicator at a time of time1 using a CoAP Observe message having an option including content of Observe: time1, Token: 0x5a, and a payload of HW_load_indicator indicative of the hardware load of APs having AP id 5 and AP id 7. In 1206, controller 902 sends a notification of a change of state of the HW_load_indicator resource indicator for AP id 1 and AP id 2 at a time of time2 using a CoAP Observe message having an option including content of Observe: time2, Token: 0x5a, and a payload of the HW_load_indicator resource indicator for AP id 1 and AP id 2.

Figure 13:
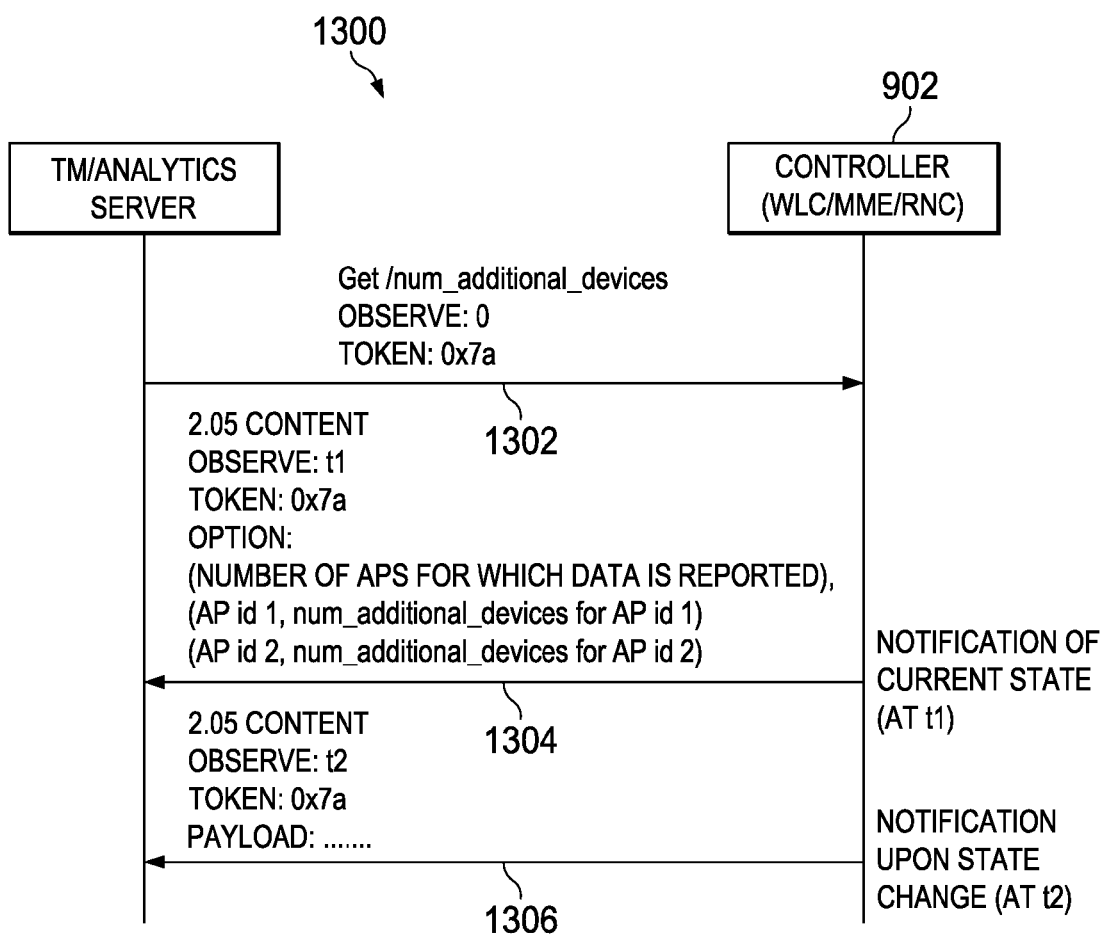
FIG. 13 is a simplified flow diagram of communication of another resource indicator from the network controllers to the traffic management/analytics module in accordance with one embodiment of the present disclosure.

Referring now to FIG. 13, FIG. 13 is a simplified flow diagram 1300 of communication of a num_additional_devices resource indicator from network controllers to traffic management/analytics module 112 using CoAP in accordance with one embodiment of the present disclosure. In 1302, traffic management/analytics module 112 sends a request to receive a num_additional_devices resource indicator from network controller 902 using a CoAP Observe message having an option including content of Get/num_additional_devices, Observe: 0, and Token: 0x7a. In response to receiving the request, network controller 902 notifies traffic management/analytics module 112 of num_additional_devices based upon one or more policies. For example, network controller 902 may notify traffic management/analytics module 112 whenever a change in num_additional_devices is above a predetermined threshold. In an alternative embodiment, network controller 902 may notify traffic management/analytics module 112 of num_additional_devices periodically.

In 1304, network controller 902 sends a notification of the current state of num_additional_devices at a time of time1 using a CoAP Observe message having an option including content of Observe: time1, Token: 0x7a, and a payload of num_additional_devices resource indicators for AP id 1 and AP id 2. In 1306, wireless AP 302 sends a notification of the state change of num_additional_devices at a time of time2 using a CoAP Observe message having an option including content of Observe: time2, Token: 0x7a, and a payload of num_additional_devices resource indicators for AP id 1 and AP id 2.

Figure 14:
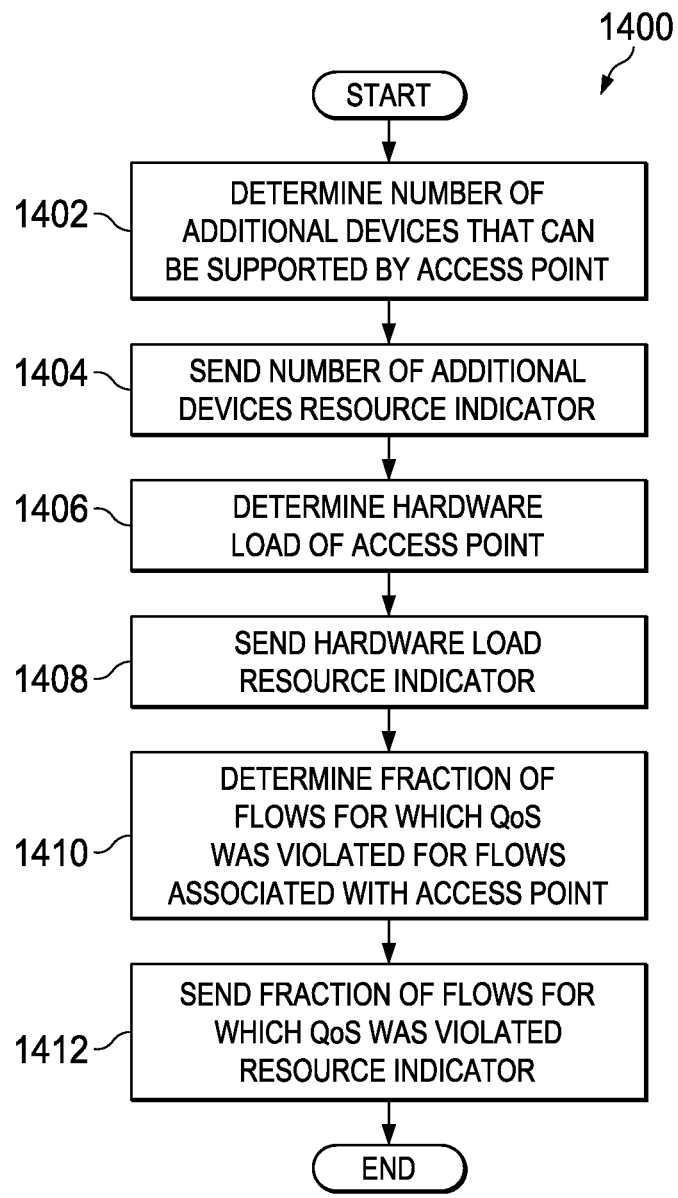
FIG. 14 is a simplified flowchart that illustrates example operations associated with determining resource indicators associated with a wireless AP and sending the resource indicators to the traffic management/analysis module in accordance with one embodiment of the present disclosure.

Referring now to FIG. 14, FIG. 14 is a simplified flowchart that illustrates example operations 1400 associated with determining resource indicators associated with a wireless AP (such as one or more of wireless APs 302a-302f) and sending the resource indicators to traffic management/analytics module 112 in accordance with one embodiment of the present disclosure. In 1402, the wireless AP determines the number of additional devices that can be supported by the wireless access point as previously described herein. In 1404, the wireless AP sends a first resource indicator indicative of a number of additional devices that can be supported by the wireless AP such as the num_additional_devices resource indicator described herein. In 1406, the wireless AP determines a hardware load of the wireless AP as described herein. In 1408, the wireless AP sends a second resource indicator indicative of the hardware load of the wireless AP such as the HW_load_indicator as described herein.

In 1410, the wireless AP determines a fraction of flows for which QoS was violated for flows associated with the access point as previously described herein. In 1412, the wireless AP sends a third resource indicator indicative of the fraction of flows for which QoS was violated for flows associated with the access point such as the frac_qos_viol_indicator as previously described herein. The operations then end.

Figure 15:
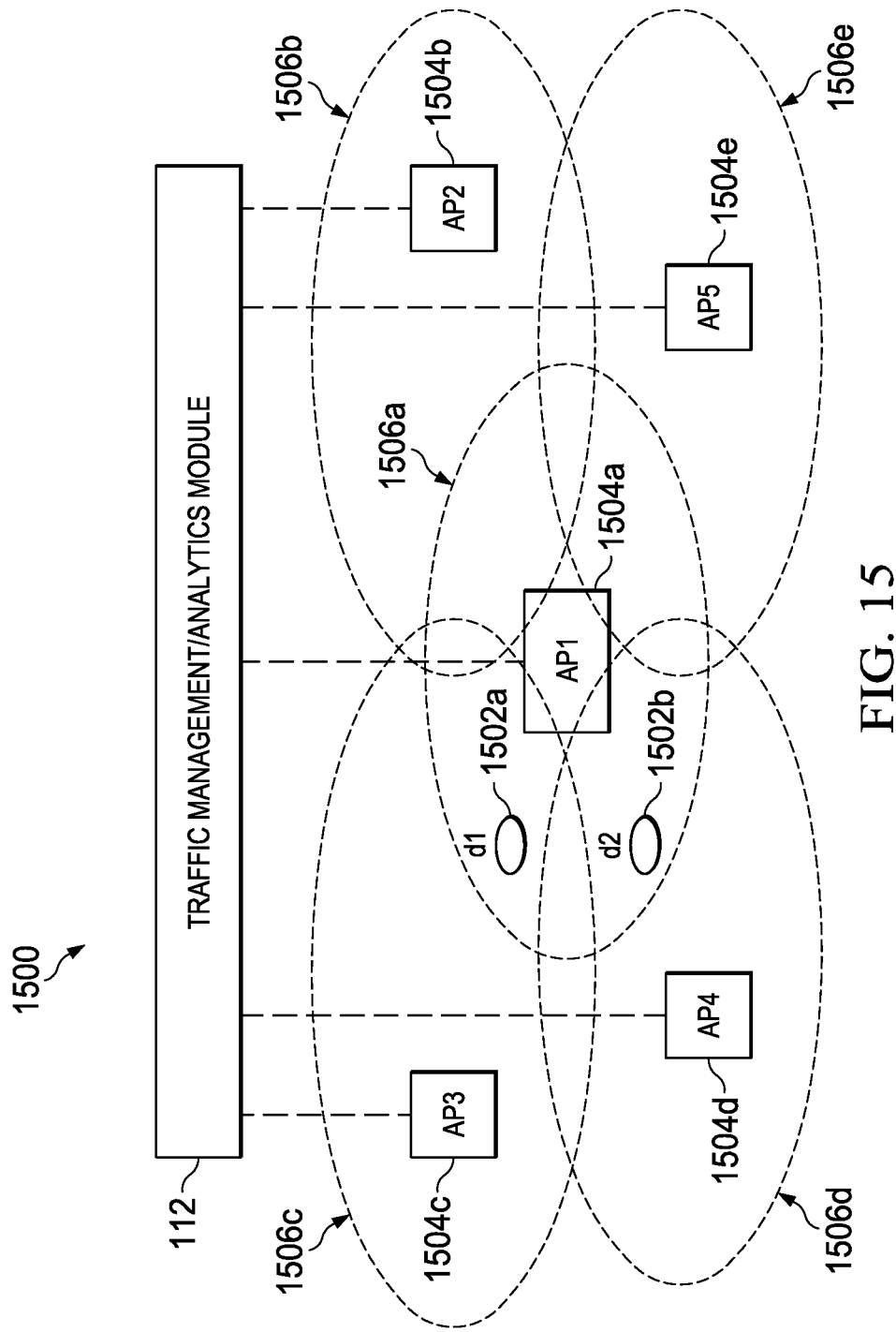
FIG. 15 is a simplified block diagram of a communication system for enhancing access network selection for a machine-to-machine wireless device using the traffic management/analytics module in accordance with one embodiment of the present disclosure.

Referring now to FIG. 15, FIG. 15 is a simplified block diagram of a communication system 1500 for enhancing access network selection for a machine-to-machine wireless device using traffic management/analytics module 112 in accordance with one embodiment of the present disclosure. Communication system 1500 includes a first M2M device (d1) 1502a and a second M2M device (d2) 1502b. Communication system 1500 further includes a number of wireless APs 1504a-1504e in communication with traffic management/analytics module 112. First AP (AP1) 1504a has a first coverage area 1506a, second AP (AP2) 1504b has a second coverage area 1506b, third AP (AP3) 1504c has a third coverage area 1506c, fourth AP (AP4) 1504d has a fourth coverage area 1506d, and fifth AP (AP5) 1504e has a fifth coverage area 1506e.

In the particular embodiment illustrated in FIG. 15, AP2 1504b, AP3 1504c, AP4 1504d, and AP5 1504e represent a candidate list of APs for AP1 1504a including APs that have overlapping areas in terms of coverage with AP1 1504a. For each AP, a neighborhood cluster may be created using typical self-organizing network (SON) and/or network planning techniques in particular embodiments. M2M device d1 1502a should ideally choose between AP1 1504a, AP2 1504b and AP3 1504c. M2M device d2 1502b should ideally choose between AP1 1504a, AP4 1504d and AP5 1504e. In particular embodiments, these APs 1504a-1504e may be configured to support the same or different RATs (such as WLAN, LTE/3G). In addition, one or more of the M2M devices 1502a-1502b may be configured to support one or multiple RATs. For example, a video camera for surveillance purposes may support multiple RATs while a low end M2M device may support one RAT only. In another example, a low end M2M device that is used for safety critical purposes may support multiple RATs. In accordance with one or more embodiments, traffic management/analytics module 112 is configured to determine and provide a list of "good" and/or acceptable candidate APs to M2M devices to assist the M2M devices in selection of an appropriate AP for network access. Resource indicators as previously described herein are communicated to traffic management/analytics module 112, and traffic management/analytics module 112 generates a list of candidate APs for each M2M device based upon the received resource indicators, generates a network selection metric for each candidate AP, and provides the list of candidate APs and associated network selection metric to each M2M device.

In one or more embodiments traffic management/analytics module 112 receives the resource indicators including num_additional_devices, HW_load_indicator, and frac_qos_viol_indicator from one or more different AP and computes a network selection metric from one or more of the resource indicators to assist the M2M devices in selecting an AP for network access.

In at least one embodiment, a network selection metric, metric$^{h,q}$ is defined using the HW_load_indicator and frac_qos_viol_indicator resource indicators as follows:

$$\text{metric}^{h,q}(\text{HW\_load\_indicator}, \text{frac\_qos\_viol\_indicator}) = (\text{HW\_load\_indicator})^{\mu(HW\_load\_indicator)} * \text{frac\_qos\_viol\_indicator}$$

Here, μ(HW_load_indicator), is a configurable parameter and it is dependent on HW_load_indicator itself. Table 3 and Table 4 illustrate examples of computation of the metric (HW_load_indicator, frac_qos_viol_indicator).

TABLE 3

| HW_load_ indicator | frac_qos_ viol_indicator | metric$^{h,q}$ (HW_load_indicator, frac_qos_viol_indicator) with μ (L) = 1.5 = μ (M), and μ (H) = 2 |
|---|---|---|
| L (=1) | L (=1) | 1 |
| L (=1) | M (=2) | 2 |
| L (=1) | H (=3) | 3 |
| M (=2) | L (=1) | $2^{1.5}$ ~ 2.82 |
| M (=2) | M (=2) | $2^{1.5}$ *2 ~ 5.6 |
| M (=2) | H (=3) | $2^{1.5}$ *3 ~ 8.4 |
| H (=3) | L (=1) | $3^2$ *1 = 9 |
| H (=3) | M (=2) | $3^2$ *2 = 18 |
| H (=3) | H (=3) | $3^2$ *3 = 27 |

Table 4 provides an example of computing the network selection metric with three-step values for HW_load_indicator and frac_qos_viol_indicator. It should be noted from Table 3:

$$\text{metric}^{h,q}(L,L) < \text{metric}^{h,q}(L,M) < \text{metric}^{h,q}(M,L) < \text{metric}^{h,q}(L,H) < \text{metric}^{h,q}(M,M) < \text{metric}^{h,q}(M,H) < \text{metric}^{h,q}(H,L) < \text{metric}^{h,q}(H,M) < \text{metric}^{h,q}(H,H)$$

Given a choice, a M2M device should select an AP with a lower value of metric$^{h,q}$ if other factors (such as received signal strength from that AP, and the additional number of devices that can be supported on that AP) are not significantly different.

TABLE 4

| HW_load_ indicator {L = 1, M = 2, H = 3, Overload = 4} | frac_qos_ viol_indicator {L = 1, M = 2, H = 3, very high = 4} | metric$^{h,q}$ (HW_load_indicator, frac_qos_viol_indicator) with μ (L) = 1, μ (M) = 1.5, μ (H) = 2, μ (OL) = 3 |
|---|---|---|
| L (=1) | L (=1) | 1 |
| L (=1) | M (=2) | 2 |
| L (=1) | H (=3) | 3 |
| L (=1) | VH (=4) (Could happen because all M2M / user devices in bad channel conditions or lot of interference with neighboring APs in this area) | 4 |

TABLE 4-continued

| HW_load_ indicator {L = 1, M = 2, H = 3, Overload = 4} | frac_qos_ viol_indicator {L = 1, M = 2, H = 3, very high = 4} | metric$^{h,q}$ (HW_load_indicator, frac_qos_viol_indicator) with μ (L) = 1, μ (M) = 1.5, μ (H) = 2, μ (OL) = 3 |
|---|---|---|
| M (=2) | L (=1) | $2^{1.5}$ ~ 2.82 |
| M (=2) | M (=2) | $2^{1.5}$ *2 ~ 5.6 |
| M (=2) | H (=3) | $2^{1.5}$ *3 ~ 8.4 |
| M (=2) | OH (=4) | $2^{1.5}$ *4 ~ 11.28 |
| H (=3) | L (=1) | $3^2$ *1 = 9 |
| H (=3) | M (=2) | $3^2$ *2 = 18 |
| H (=3) | H (=3) | $3^2$ *3 = 27 |
| H (=3) | VH (=4) | $3^2$ *4 = 36 |
| OL (=4) | L (=1) | $4^3$ *1 = 64 |
| OL (=4) | M (=2) | $4^3$ *2 = 128 |
| OL (=4) | H (=3) | $4^3$ *3 = 192 |
| OL (=4) | VH (=4) | $4^3$ *4 = 256 |

Table 5 provides an example of computing the network selection metric with four-step values for HW_load_indicator and frac_qos_viol_indicator.

A normalized additional devices indication for an AP may be defined as follows:

$$\text{num\_additional\_devices\_normalized}(\text{AP\_id} = i, \text{time } t) = \frac{\text{num\_additional\_devices}(i, t)}{\min_{k \in nborhood(i)} \text{num\_additional\_devices}(k, t)}$$

For example, neighborhood (AP1)={AP2, AP3, AP4, AP5} in FIG. 15.

Defining another measure for an indication of a number of devices that can supported per AP (as used in computation of the metric) is as follows:

$$\text{num\_additional\_devices\_normalized}^{threshold} = \min(\text{num\_additional\_devices}, \text{additional\_devices\_threshold})$$

Here, additional_device_threshold, is a configurable threshold. It is used to represent a number of devices that can be supported across different types of APs such as Femto/Pico/Metro/Macro APs, and can vary over a wide range. In accordance with the particular example metric, these values are first normalized these values as indicated above and then the maximum value of that bounded is kept by a configurable threshold for the purpose of the computation of metric$^{h,q,n}$. An example is given in Table 5 where additional_devices_threshold is taken to be 3.

TABLE 5

|  | AP1 | AP2 | AP3 | AP4 | AP5 |
|---|---|---|---|---|---|
| num_additional_devices | 5 | 10 | 15 | 20 | 20 |
| num_additional_devices_normalized | 1 | 2 | 3 | 4 | 4 |
| additional_devices_threshold | 3 | 3 | 3 | 3 | 3 |
| num_additional_devices_normalized$^{threshold}$ | 1 | 2 | 3 | 3 | 3 |

In addition to APs, some other GWs/routers in the network also have limitations on the number of devices and/or sessions that they can support. For example, a Home (e) NodeB gateway can support a certain fixed number of active devices/sessions. Other gateways or network nodes may also have limitations on the number of devices and/or sessions that can be supported. Multiple WiFi APs may be communicating via one or more gateways. These APs may be able to support a higher number of active devices/sessions than the active sessions/devices that can be supported by other gateway types. Similar situation may exist for gateways with multiple Cellular APs communicating via the gateway. Accordingly, in one or more embodiments, the resource indicators can also used to determine a value of additional_devices_threshold such as shown in Table 6.

In other embodiments, a network selection metric is defined using the $metric^{h,q}(\ )$ in addition to the resource indicator indicative of the number of additional devices that can be supported on an AP as follows:

$$metric^{h,q,n}(HW\_load\_indicator, frac\_qos\_viol\_indicator,$$
$$num\_additional\_devices) = \frac{metric^{h,q}}{num\_additional\_devices\_normalized^{threshold}}$$

In one or more embodiments, this network selection metric is computed for each AP and it is used to select a list of good candidate APs in the neighborhood of any given AP. One or more M2M devices may use this information along with received signal strength from each AP to decide a suitable AP for network access.

Figure 16:
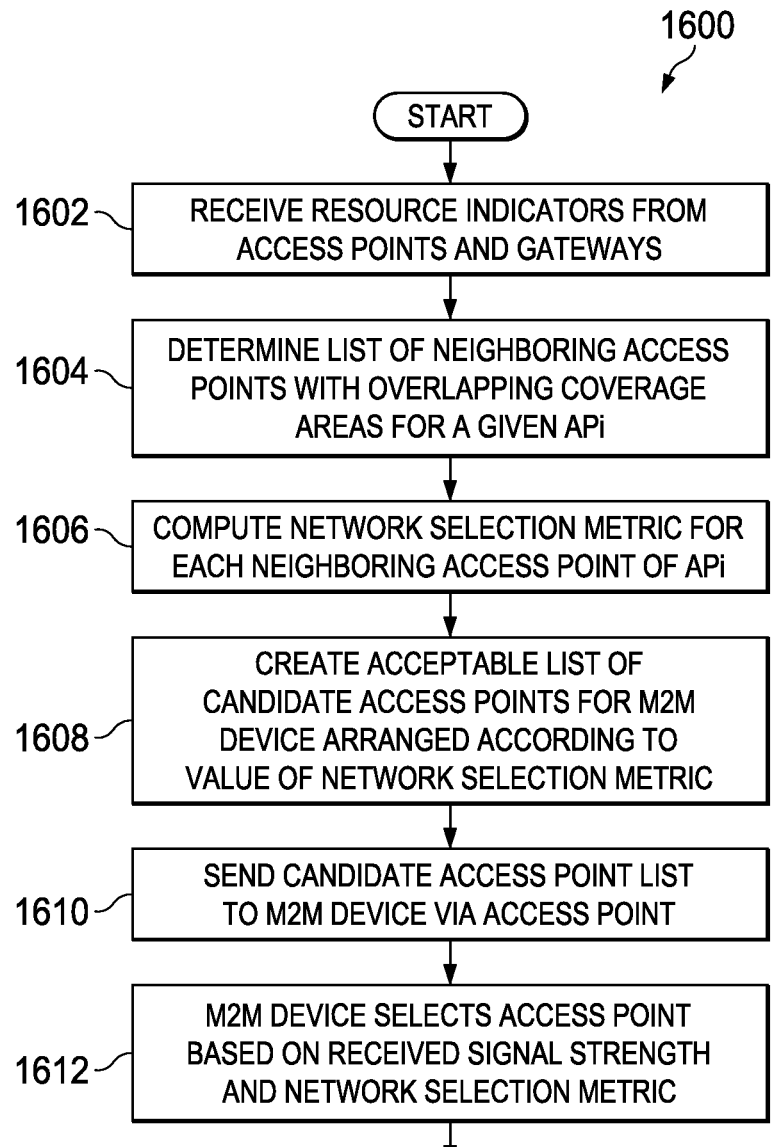
FIG. 16 is a simplified flowchart that illustrates example operations associated with the traffic management/analytics module for enhancing access network selection for a machine-to-machine wireless device in accordance with one embodiment.

Referring now to FIG. 16, FIG. 16 is a simplified flowchart that illustrates example operations 1600 associated with traffic management/analytics module 112 for enhancing access network selection for a machine-to-machine wireless device in accordance with one embodiment. In 1602, traffic management/analytics module 112 receives resource indicators from one or more of APs 1504a-1502e and/or wireless controllers or wireless gateways. In accordance with at least one embodiment, the resource indicators include a hardware load indicator of the AP (HW_load_indicator), an indicator of the fraction of QoS violations for flows associated with the AP (frac_qos_viol_indicator) and indication of number of devices and/or sessions that can be supported by APs (or gateways) as previously described herein.

In 1604, traffic management/analytics module 112 determines a list of neighboring APs with overlapping coverage area for a given APi (for example AP1 1504a). In particular embodiments, the determination of neighboring APs may be based upon information obtained from SON and/or network planning servers.

In 1606, traffic management/analytics module 112 computes a network selection metric for each neighboring AP of APi based upon the resource indicators obtained by traffic management/analytics module 112 including one or more of the hardware load indicator, the indicator of the fraction of QoS violations, and the number of additional devices that may be supported for each AP. In a particular embodiment in which HW_load_indicator and fraq_qos_viol_indicator are available to traffic management/analytics module 112, the network selection metric for each AP may be determined as follows:

$metric^{h,q}(HW\_load\_indicator, frac\_qos\_viol\_indicator)=(HW\_load\_indicator)^{u(HW\_load\_indicator)}*frac\_qos\_viol\_indicator$ In a particular embodiment in which HW_load_indicator, fraq_qos_viol_indicator, and numb_additional_devices are available to traffic management/analytics module 112, the network selection metric for each AP may be determined as follows:

$$metric^{h,q,n}(HW\_load\_indicator, frac\_qos\_viol\_indicator,$$
$$num\_additional\_devices) = \frac{metric^{h,q}}{num\_additional\_devices\_normalized^{threshold}}$$

In 1608, traffic management/analytics module 112 creates an acceptable list of candidate APs for a particular M2M device (such as M2M device d1 (1502a)) trying to access APi. The candidate APs are arranged according to the value of the network selection metric for each AP. In 1610, traffic management/analytics module 112 sends the candidate AP list to the M2M device via an AP. In 1612, the M2M device selects the particular AP for access to the network based upon received signal strength from the M2M device to the AP and the network selection metric. A candidate AP with a lower value of network selection metric is preferred for selection over a candidate AP with a higher value of the network selection metric. In particular embodiments, the M2M device may select the AP having both the lowest value of the network selection metric and an acceptable signal strength. The operations 1600 then end.

Figure 17:
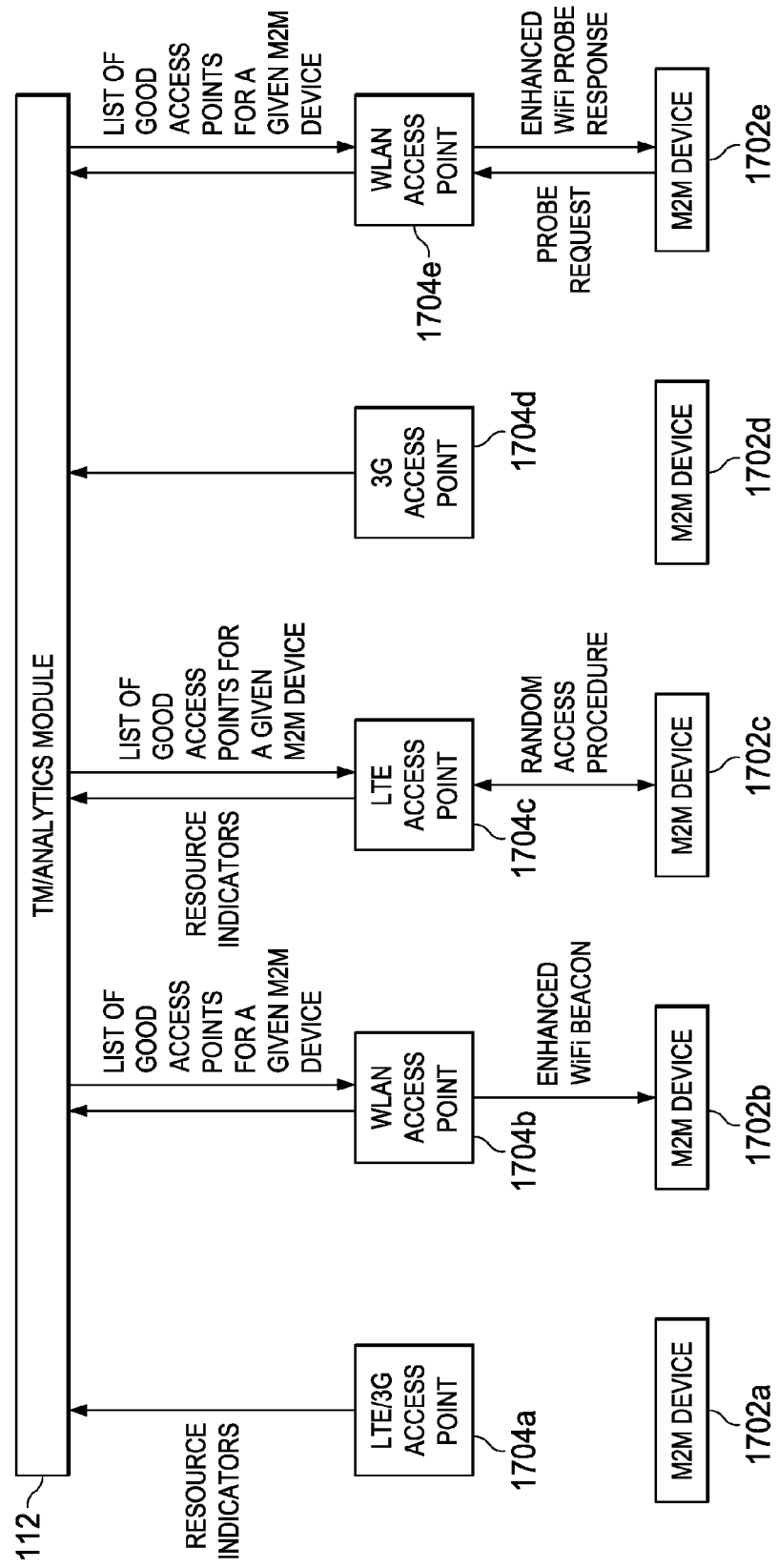
FIG. 17 is a simplified block diagram of a communication system for providing a candidate AP list to an M2M device for providing network assisted access network selection in accordance with one embodiment.

Referring now to FIG. 17, FIG. 17 is a simplified block diagram of a communication system 1700 for providing a candidate AP list to an M2M device for providing network assisted access network selection in accordance with one embodiment. Communication system 1700 includes a first M2M device 1702a, a second M2M device 1702b, a third M2M device 1702c, a fourth M2M device 1702d, and a fifth M2M device 1702e. Communication system 1700 further includes a first wireless AP 1704a, a second wireless AP 1704b, a third wireless AP 1704c, a fourth wireless AP 1704d, a fifth wireless AP 1704e, and TM/analytics module 112. In the particular embodiment illustrates in FIG. 1700, first wireless AP 1704a is an LTE/3G AP, second wireless AP 1704b is a WLAN AP, third wireless AP 1704c is an LTE AP, fourth wireless AP 1704d is a 3G AP, and fifth wireless AP 1704e is a WLAN AP.

Each of first wireless AP 1704a, second wireless AP 1704, third wireless AP 1704c, fourth wireless AP 1704d, and fifth wireless AP 1704e is configured to send one or more resource indicators to traffic management/analytics module 112 as previously discussed herein. Traffic management/analytics module 112 is configured to calculate a network selection metric for one or more of wireless APs 1704a-1704e, determine one or more candidate AP lists (list of "good" APs) for a given M2M device based upon the calculated network selection metrics, and send the candidate AP lists to one or more of wireless APs 1704a-1704e as previously discussed herein. The one or more wireless APs 1704a-1704e are further configured to send the candidate AP list to one of M2M devices 1702a-1702e using a procedure that is dependent upon the particular RAT type of the wireless AP as will be further described herein.

In a particular embodiment, for communication between a WiFi (or WiFi-Cellular) AP and an M2M device an enhanced WiFi beacon with vendor specific extensions may be used to send a candidate AP list. In a particular example, WLAN AP 1704b may periodically send an enhanced WiFi beacon message including vendor specific extensions to include a list of suitable ("good") nearby APs for second M2M device 1702b. The enhanced WiFi beacon message may be received by second M2M device 1702b and the list of candidate APs may be used by second M2M device 1702b along with signal strength measurements to select a particular AP to establish a connection and/or session therewith. In still another particular embodiment, WLAN AP 1704e may receive a probe request message from fifth M2M device 1702e and respond with an enhanced probe response message including the list of candidate APs. The enhanced WiFi probe response message may be received by third M2M device 1702e and the list of candidate APs may be used by fifth M2M device 1702e along with signal strength measurements to select a particular AP to establish a session therewith.

Figure 18:
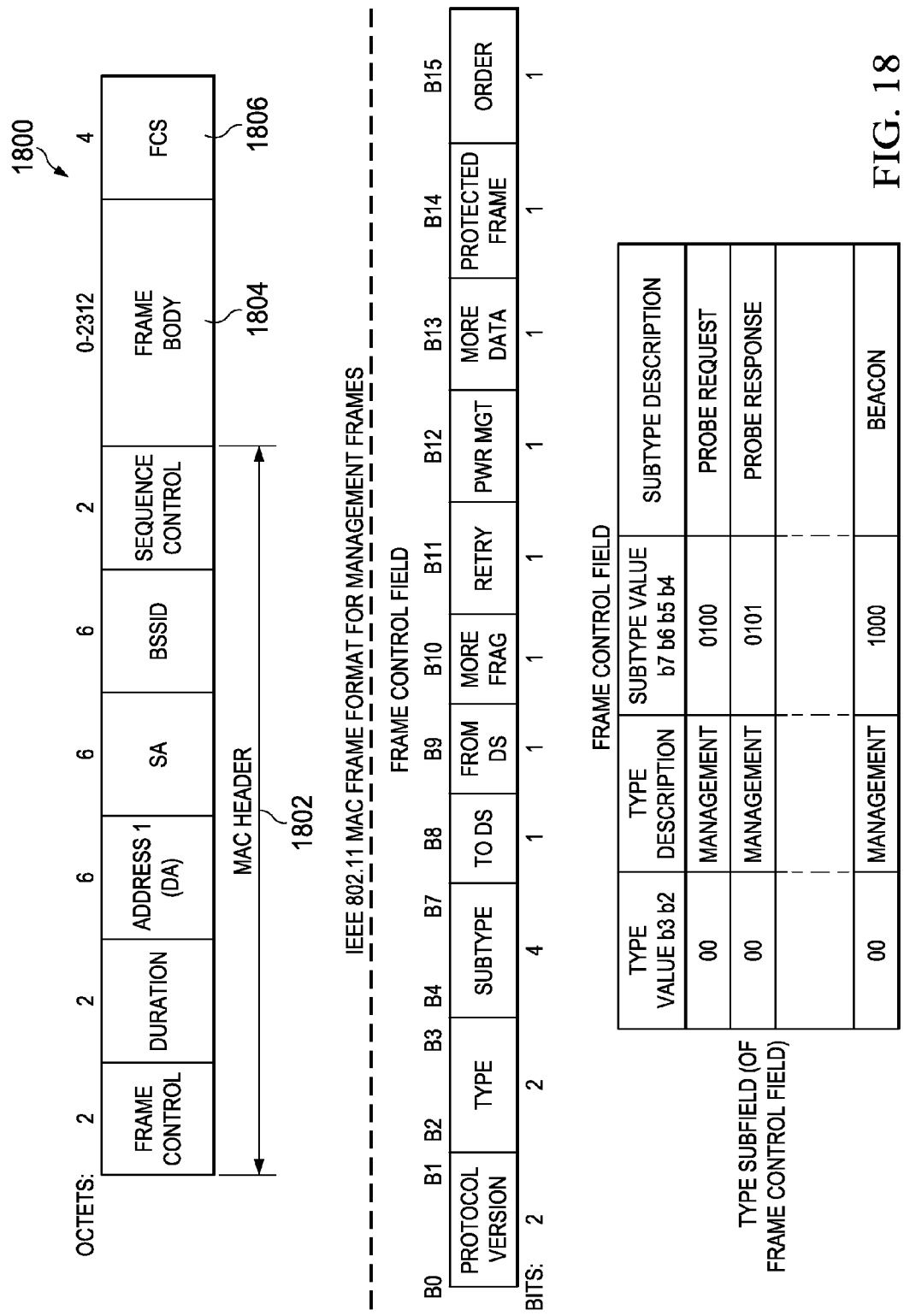
FIG. 18 is a simplified diagram of a MAC frame format for a management frame of a beacon or probe response message.

Referring now to FIG. 18, FIG. 18 is a simplified diagram of a MAC frame format 1800 for a management frame of an IEEE 802.11 Beacon or Probe Response Message. The MAC frame format 1800 includes 24 octets of s MAC header 1802 including a frame control field, a duration field, a destination address (DA) field, a source address (SA) field, a BSSID field containing the MAC address of the AP, and a sequence control field. The MAC frame format 1800 further includes a frame body 1804, and a frame check sequence 1806. The frame control filed of MAC header 1802 includes two protocol version bits, two type bits, four subtype bits, one To DS bit, one From DS bit, one More Frag bit, one retry bit, one power management (Pwr Mgt) bit, one more Data bit, one protected frame bit, and one order bit. The value of "00" for the two type bits designates a particular MAC frame as a management type frame. A subtype value of "0100" designates a probe request message, a subtype value of "0101" designates a probe response message, and a subtype value of "1000" designates a beacon message. In accordance with various embodiments, the list of candidate APs may be included within frame body 1804 as will be further described herein.

Figure 19:
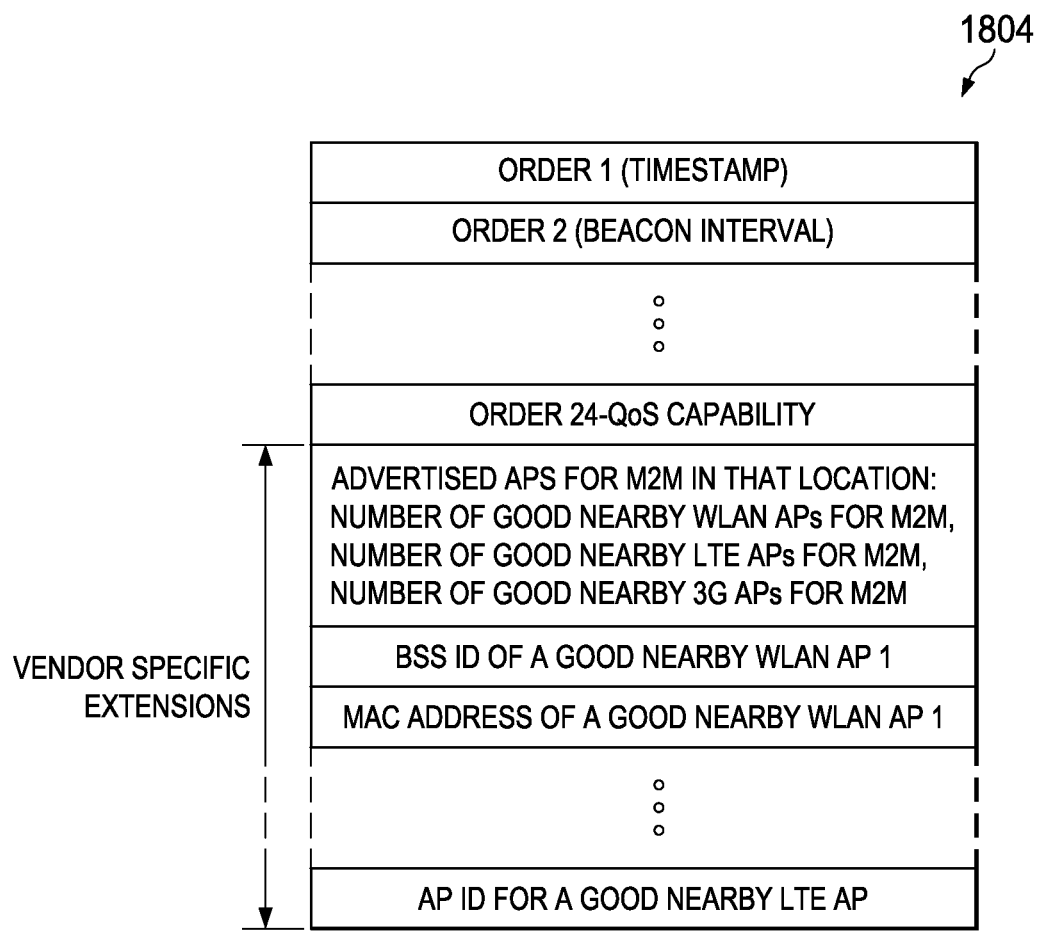
FIG. 19 illustrates a frame body of a WiFi beacon frame including a list of candidate APs for a particular M2M device according to one embodiment.

Referring now to FIG. 19, FIG. 19 illustrates a frame body 1804 of a WiFi beacon frame including a list of candidate APs for a particular M2M device according to one embodiment. In a particular embodiment, the WiFi beacon frame including the list of candidate APs may be transmitted, for example periodically, by WLAN AP 1704b. Frame body 1804 includes, in addition to standard fields such as a timestamp, beacon interval, and QoS capability fields, a list of candidate APs for a particular M2M device within the vendor specific extension portion. In particular embodiments, the vendor specific extensions may include the advertised APs for the M2M device in that location including: an indication of the number of good nearby WLAN APs for the M2M device, an indication of the number of good nearby LTE APs for the M2M device, and an indication of the number of good nearby 3G APs for the M2M device. The vendor specific extensions further include one or more identifiers for each of the APs. For example, for a good nearby WLAN AP, a basic service set identification (BSS ID) and MAC address of the WLAN AP may be included. In another example, an access point identifier (AP ID) for a good nearby LTE AP may be included. In one or more embodiments, traffic management/analytics module 112 may determine the number of APs to advertise in a particular location for M2M purposes. For example, traffic management/analytics module 112 may determine to advertise two good WiFi APs only and not advertise any LTE/3G APs for a particular location.

Figure 20:
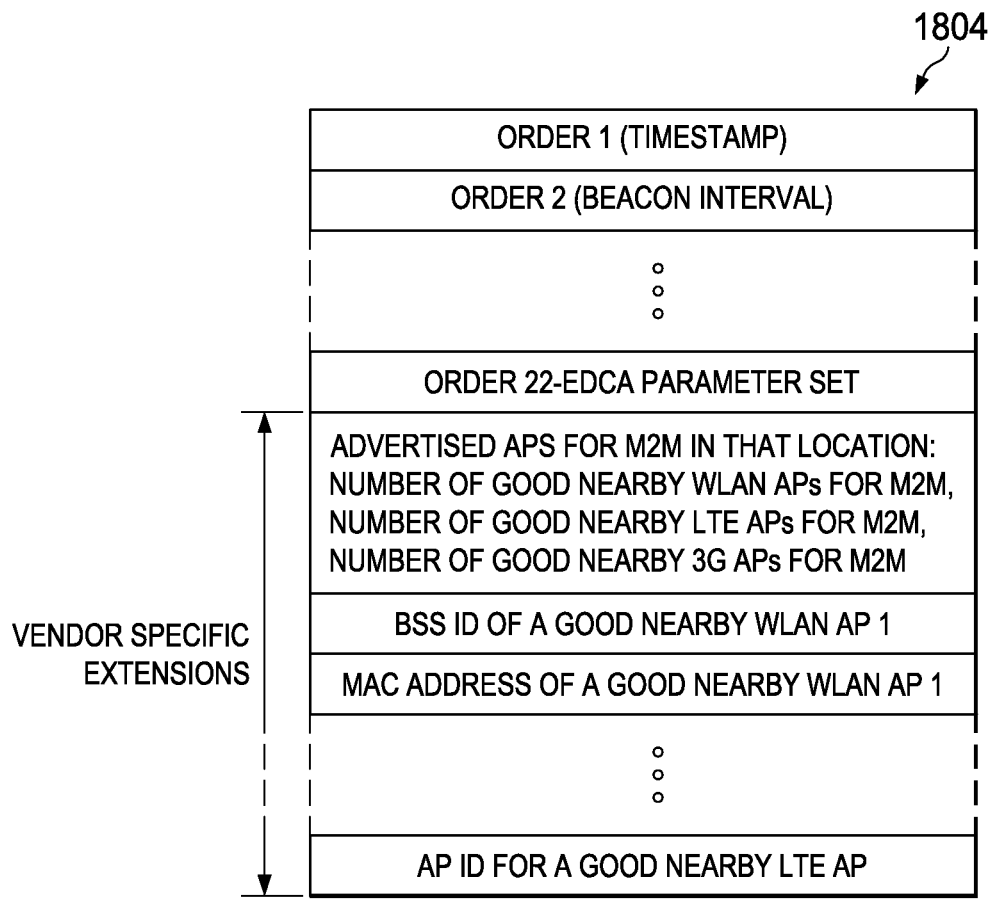
FIG. 20 illustrates a frame body of a WiFi probe response frame including a list of candidate APs for a particular M2M device according to one embodiment.

Referring now to FIG. 20, FIG. 20 illustrates a frame body 1804 of a WiFi probe response frame including a list of candidate APs for a particular M2M device according to one embodiment. In a particular embodiment, the WiFi probe response frame including the list of candidate APs may be transmitted by WLAN AP 1704e in response to receiving a WiFi probe request message from fifth M2M device 1702e. Frame body 1804 includes, in addition to standard fields such as a timestamp, beacon interval, and AP Enhanced Distributed Channel Access (EDCA) parameters set fields, a list of candidate APs for a particular M2M device within the vendor specific extension portion. In particular embodiments, the vendor specific extensions may include the advertised APs for the M2M device in that location including: an indication of the number of good nearby WLAN APs for the M2M device, an indication of the number of good nearby LTE APs for the M2M device, and an indication of the number of good nearby 3G APs for the M2M device. The vendor specific extensions further include one or more identifiers for each of the APs. For example, for a good nearby WLAN AP, a basic service set identification (BSS ID) and MAC address of the WLAN AP may be included. In another example, an access point identifier (AP ID) for a good nearby LTE AP may be included. In one or more embodiments, traffic management/analytics module 112 may determine the number of APs to advertise in a particular location for M2M purposes. For example, traffic management/analytics module 112 may determine to advertise two good WiFi APs only and not advertise any LTE/3G APs for a particular location.

In accordance with at least one embodiment, for communication between a cellular (or cellular-WiFi) AP and a cellular (or cellular-WiFi) M2M a session establishment procedure, such as an initial random access procedure, may be used to send a candidate AP list. In a particular example, LTE AP 1704c may send the candidate AP list to third M2M device 1702c during an attempted establishment of an initial random access procedure between LTE AP 1704c and third M2M device 1702c. In particular situations, the list of "good" candidate APs may be indicated to M2M device 1702c upon failure of the initial random access procedure. In other particular examples, the list of "good" candidate APs may be indicated to M2M device 1702c when the initial random access procedure with M2M device 1702c but for which required control and/or data plan communication is not available with the particular AP. In one or more embodiments, M2M device 1702c may then use the list of candidate APs in addition to signal strength measurements to attempt to establish a session with an AP.

As a large number of cellular (e.g., LTE or 3G) M2M devices attempt to join a network via an LTE AP, the M2M devices go through a random access procedure (such as a random-access procedure in 3GPP). In accordance with one or more embodiments, the random access procedure provides M2M devices with a list of a few good APs that have coverage in that neighborhood in the one or more of the following scenarios: (1) If the number of cellular M2M devices attempting to join a cellular AP is quite high, a RACH attempt can fail for some M2M devices. In such cases, the cellular AP may provides list of some good APs in that area to such Cellular M2M devices. (2) Even if the RACH attempt succeeds, the M2M device may not be able to get required resources because that particular AP may be heavily loaded. In such cases, control plane procedures such as authentication and key agreement are not completed, and the M2M device is informed about the possibility of some other good APs in that area by receiving the candidate AP list. The M2M device can attempt to connect with an AP from this list.

Random access contention can occur when multiple M2M devices/user equipments (UEs) select the same subframe and preamble sequence for physical random access channel (PRACH) transmission. If contention occurs, the M2M device/UE needs to repeat transmission of the PRACH preamble and radio resource control (RRC) Connection Request message. This procedure fails if the maximum number of preamble transmission attempts limit is reached. Even if RACH succeeds, it may still not be possible to go ahead with control and data plane communication because that AP is heavily loaded. If an LTE AP is not able to serve an M2M device, that M2M device is given a set of good APs in that neighborhood as part of the initial random access procedure itself. The M2M device can use this information to select a suitable AP. This procedure may also avoid handover/load balancing related signaling that will happen in such scenarios in which the M2M device tries to establish a session via an LTE AP that cannot provide the required resources.

Figure 21:
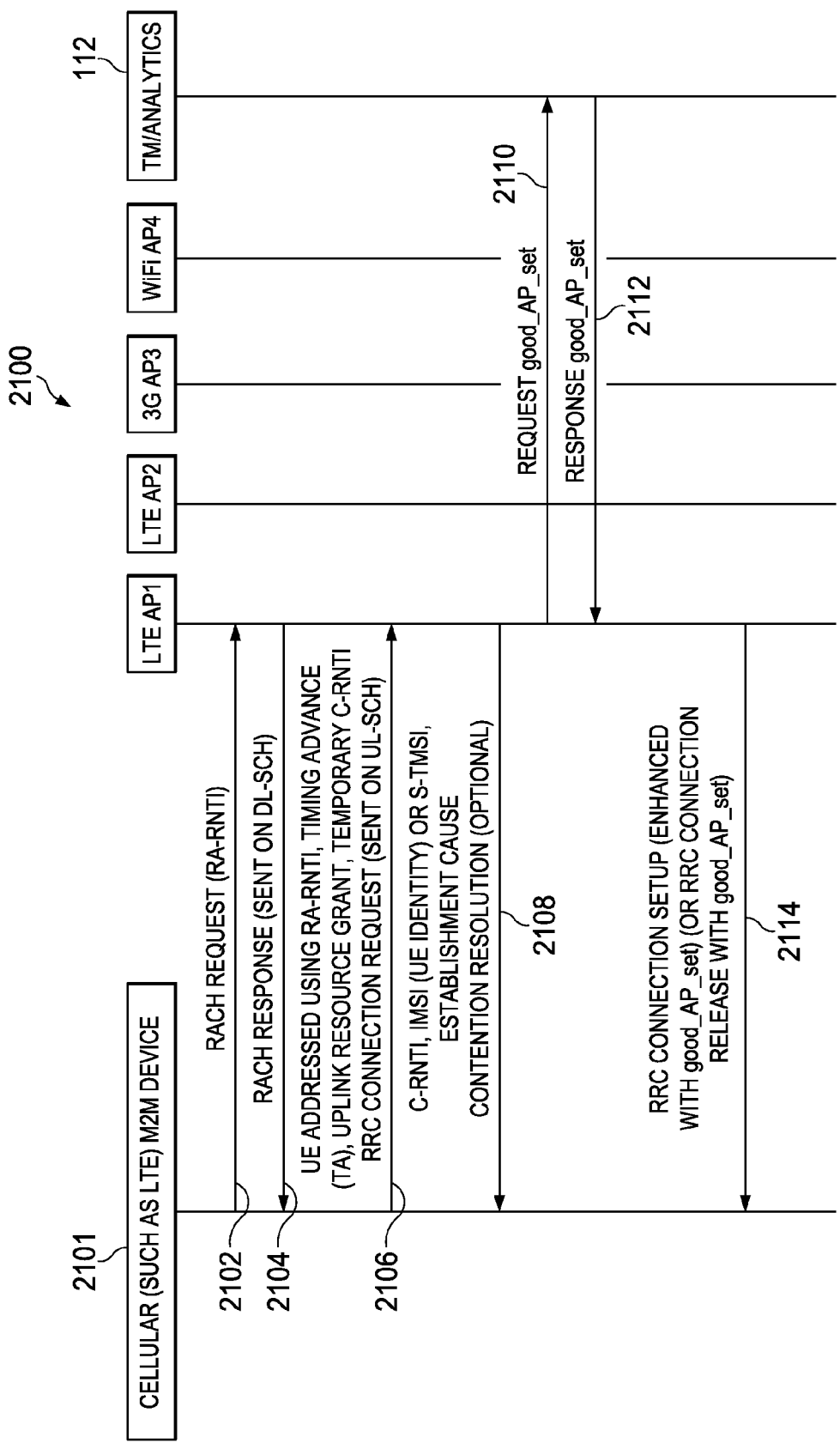
FIG. 21 is a simplified flow diagram of an enhanced access selection procedure to communicate a list of candidate APs to cellular or cellular-WiFi M2M devices in accordance with one embodiment.

Referring now to FIG. 21, FIG. 21 is a simplified flow diagram 2100 of an enhanced access selection procedure to communicate a list of candidate APs to cellular or cellular-WiFi M2M devices in accordance with one embodiment. FIG. 21 illustrates use of a random access procedure to convey the list of candidate APs to a cellular (such as an LTE) M2M device in a communication network including a first LTE AP (AP1), a second LTE AP (AP2), a 3G AP (AP3), a WiFi AP (AP4) and traffic management/analytics module 112. In a particular embodiment, traffic management/analytics module 112 is embodied within a server. In 2102, the cellular M2M device sends a random access channel request (RACH) request including a random access-radio network temporary identifier (RA-RNTI) to the first LTE AP (AP1). In 2104, the first LTE AP (AP1) sends an RACH response message to the cellular M2M device on the downlink shared channel (DL-SCH). The RACH response includes the RA-RNTI to address the UE (M2M device), a timing advance (TA), uplink resource grant, and a temporary cell RNTI (C-RNTI). In 2106, the cellular M2M device sends a radio resource control (RRC) connection request to the first LTE (AP1) on the uplink shared channel (UL-SCH). The RRC connection request includes a C-RNTI, an IMSI (UE identity) or SAE-Temporary Mobile Subscriber Identity (S-TMSI), and establishment cause. In 2108, the first LTE AP (AP1) may optionally send a contention resolution message to the cellular M2M device.

The first LTE AP (AP1) may then consider the value of its network selection metric as previously described herein. If the network selection metric is not acceptable, in 2110 the first LTE AP (AP1) sends a request message (request good_AP_set) to traffic management/analytics module 112 requesting a set of acceptable ("good") candidate APs in the neighborhood of the first LTE AP (AP1). In 2112, the first LTE AP (AP1) receives a response message (response good_AP_set) including the set of acceptable ("good") candidate APs from traffic management/analytics module 112. In 2114, the first LTE AP (AP1) sends the list of acceptable ("good") APs to the cellular M2M device via an enhanced RRC connection setup message. The cellular M2M device may then decide whether it wants to continue establishing a session with the first LTE AP (AP1). Alternately, the first LTE AP (AP1) may send the list of acceptable APs to the cellular M2M device via an RRC connection release if the first LTE AP (AP1) determines that its own score is unacceptable.

Figure 22:
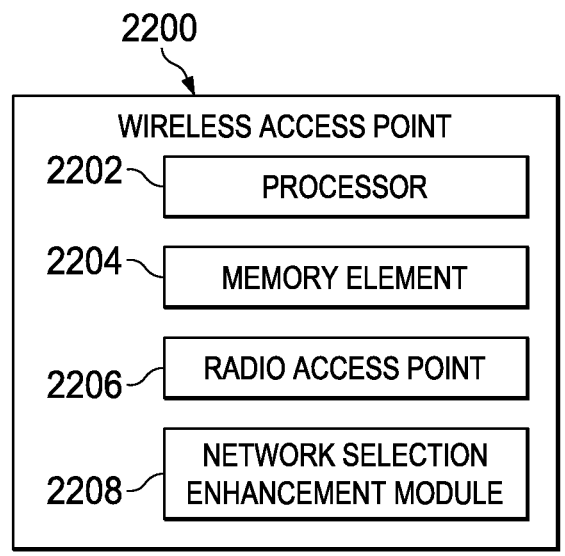
FIG. 22 is a simplified block diagram of a wireless access point in accordance with one embodiment.

Referring now to FIG. 22, FIG. 22 is a simplified block diagram of a wireless access point (AP) 2200 in accordance with one embodiment. Wireless AP 2200 includes a processor 2202, a memory element 2204, a radio access point 2206, and a network selection enhancement module 2208. In accordance with various embodiments, wireless AP 2200 may include one or more of wireless APs 104a-104g, 204a-204b, 302a-302f, 1504a-1504e, and 1704a-1704e. Processor 2202 is configured to execute various tasks of one or more of the wireless APs as described herein and memory element 2204 is configured to store data associated with the wireless AP. Radio access point 2206 is configured to communicate using a wireless radio connection, such as a 3G, 4G, WiFi, LTE connection, with one or more M2M devices. Network selection enhancement module 2208 is configured to perform the various network selection enhancement functions of one or more of wireless APs 104a-104g, 204a-204b, 302a-302f, 1504a-1504e, and 1704a-1704e described herein including but not limited to providing resource indicators to traffic management/analytics module 112, receiving lists of candidate APs from traffic management/analytics module 112, and providing the lists of candidate APs to one or more M2M devices as described herein.

Figure 23:
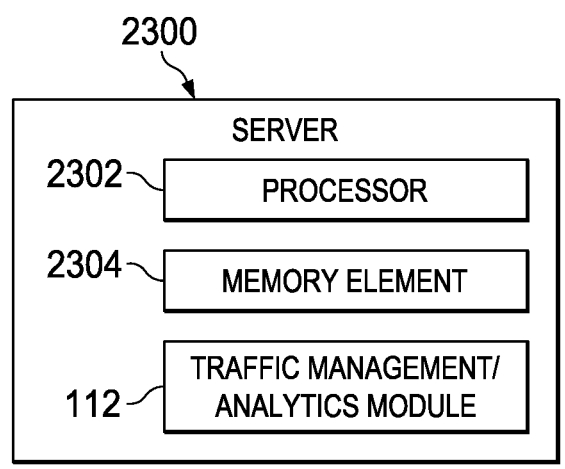
FIG. 23 is a simplified block diagram of a traffic management/analytics server in accordance with one embodiment.

Referring now to FIG. 23, FIG. 23 is a simplified block diagram of a traffic management/analytics server 2300 in accordance with one embodiment. Traffic management/analytics server 2300 includes a processor 2302, a memory element 2304, and a traffic management/analytics module 112. Processor 2302 is configured to execute various tasks of traffic management/analytics server 2300 as described herein and memory element 304 is configured to store data associated with traffic management/analytics server 2300. Traffic management/analytics module 112 is configured to perform the various functions of traffic management/analytics module 112 as described herein.

In one example implementation, M2M devices 102a-102g, 1502a-1502b, and 1702a-1702e, wireless APs 104a-104g, 204a-204b, 302a-302f, 1504a-1504e, and 1704a-1704e, wireless network controllers 902a-902c and/or traffic management/analytics module 112 are network elements that facilitate or otherwise help coordinate the network assisted access network selection activities described herein. As used herein in this Specification, the term 'network element' is meant to encompass network appliances, servers, access points, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, M2M devices 102a-102g, 1502a-1502b, and 1702a-1702e, wireless APs 104a-104g, 204a-204b, 302a-302f, 1504a-1504e, and 1704a-1704e, wireless network controllers 902a-902c and/or traffic management/analytics module 112 include software to achieve the operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

In one or more embodiments, M2M devices 102a-102g, 1502a-1502b, and 1702a-1702e, wireless APs 104a-104g, 204a-204b, 302a-302f, 1504a-1504e, and 1704a-1704e, wireless network controllers 902a-902c and/or traffic management/analytics module 112 can include memory elements for storing information to be used in achieving the operations, as outlined herein. Additionally, each of these devices may include a processor that can execute software or an algorithm to perform the activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to M2M devices 102*a*-102*g*, 1502*a*-1502*b*, and 1702*a*-1702*e*, wireless APs 104*a*-104*g*, 204*a*-204*b*, 302*a*-302*f*, 1504*a*-1504*e*, and 1704*a*-1704*e*, wireless network controllers 902*a*-902*c* and/or traffic management/analytics module 112 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the communication systems described herein are readily scalable and further can accommodate a large number of components, as well as more complicated/sophisticated arrangements and configurations. Accordingly, the examples provided should not limit the scope or inhibit the broad teachings of the communication systems as potentially applied to a myriad of other architectures.

It is also important to note that the previously described activities illustrate only some of the possible signaling scenarios and patterns that may be executed by, or within, the described communication systems. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by various embodiments described herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, the teachings described herein may be applicable to other exchanges, routing protocols, or routed protocols. Moreover, although the teachings described herein have been illustrated with reference to particular elements and operations that facilitate the communication process, these elements and operations may be replaced by any suitable architecture or process that achieves the intended functionality of the communication systems described herein.

Particular embodiments have been described with respect to wireless M2M devices within an M2M environment. However, it should be understood that the teachings described herein are applicable to other wireless devices and wireless environment such as peer-to-peer (P2P), mobile user equipment, and any other suitable wireless or wireline communication system.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
  determining a first resource indicator indicative of a first resource capability of a first network element, wherein the first resource indicator is indicative of an additional number of wireless devices that the first network element can support in a predetermined time interval;
  determining a second resource indicator indicative of a second resource capability of the first network element, wherein the second resource indicator is indicative of a hardware load of the first network element at a predetermined time;
  determining a third resource indicator indicative of a third resource capability of the first network element; and
  sending the first resource indicator, the second resource indicator, and the third resource indicator to a second network element, wherein the second network element is configured to determine a first metric value for the first network element based upon the first resource indicator, the second resource indicator, and the third resource indicator, and wherein the second network element is further configured to utilize the first metric value to determine a list of one or more acceptable network elements for a wireless device to establish a connection therewith.

2. The method of claim 1, wherein the second resource indicator includes a value indicative of either a low hardware load, a medium hardware load, or a high hardware load upon the first network element.

3. The method of claim 1, wherein the third resource indicator is indicative of a fraction of flows traversing the first network element for which a quality of service (QoS) requirement was violated.

4. The method of claim 1, wherein sending one or more of the first resource indicator, the second resource indicator, and the third resource indicator to the second network element includes including one or more of the first resource indicator, the second resource indicator, and the third resource within a Constrained Application Protocol (CoAP) protocol message.

5. The method of claim 4, wherein the CoAP protocol message is a CoAP Observe message.

6. The method of claim 4, wherein at least one of the first resource indicator, the second resource indicator, and the third resource indicator are included in an option field of the CoAP protocol message.

7. The method of claim 1, further comprising:
receiving the list of one or more network elements; and
sending the list of one or more acceptable network elements to the wireless device.

8. The method of claim 7, wherein sending the list of one or more acceptable network elements includes sending the list of one or more acceptable network elements within at least one of a WiFi beacon message, a WiFi probe response message, or a cellular random access procedure message.

9. The method of claim 1, wherein the first network element includes a wireless access point.

10. The method of claim 1, wherein the second network element includes a server.

11. Logic encoded in one or more non-transitory media that includes code for execution and when executed by a processor operable to perform operations comprising:
determining a first resource indicator indicative of a first resource capability of a first network element, wherein the first resource indicator is indicative of an additional number of wireless devices that the first network element can support in a predetermined time interval;
determining a second resource indicator indicative of a second resource capability of the first network element, wherein the second resource indicator is indicative of a hardware load of the first network element at a predetermined time;
determining a third resource indicator indicative of a third resource capability of the first network element; and
sending the first resource indicator, the second resource indicator, and the third resource indicator to a second network element, wherein the second network element is configured to determine a first metric value for the first network element based upon the first resource indicator, the second resource indicator, and the third resource indicator, and wherein the second network element is further configured to utilize the first metric value to determine a list of one or more acceptable network elements for a wireless device to establish a connection therewith.

12. The logic of claim 11, wherein the second resource indicator includes a value indicative of either a low hardware load, a medium hardware load, or a high hardware load upon the first network element.

13. The logic of claim 11, wherein the third resource indicator is indicative of a fraction of flows traversing the first network element for which a quality of service (QoS) requirement was violated.

14. The logic of claim 11, further comprising:
receiving the list of the one or more acceptable network elements; and
sending the list of one or more acceptable network elements to the wireless device.

15. A first network element, comprising:
a memory element configured to store electronic code;
a processor operable to execute instructions associated with the electronic code; and
a module coupled to the memory element and the processor, wherein the first network element is configured for:
determining a first resource indicator indicative of a first resource capability of the first network element, wherein the first resource indicator is indicative of an additional number of wireless devices that the first network element can support in a predetermined time interval;
determining a second resource indicator indicative of a second resource capability of the first network element, wherein the second resource indicator is indicative of a hardware load of the first network element at a predetermined time;
determining a third resource indicator indicative of a third resource capability of the first network element; and
sending the first resource indicator, the second resource indicator, and the third resource indicator to a second network element, wherein the second network element is configured to determine a first metric value for the first network element based upon the first resource indicator, the second resource indicator, and the third resource indicator, and wherein the second network element is further configured to utilize the first metric value to determine a list of one or more acceptable network elements for a wireless device to establish a connection therewith.

16. The first network element of claim 15, wherein the second resource indicator includes a value indicative of either a low hardware load, a medium hardware load, or a high hardware load upon the first network element.

17. The first network element of claim 1, wherein the third resource indicator is indicative of a fraction of flows traversing the first network element for which a quality of service (QoS) requirement was violated.

18. The first network element of claim 15, wherein the first network element is configured for:
receiving the list of the one or more acceptable network elements; and
sending the list of one or more acceptable network elements to the wireless device.

19. The first network element of claim 15, wherein the first network element includes a wireless access point.

* * * * *